(12) United States Patent
MacPherson et al.

(10) Patent No.: US 9,862,177 B2
(45) Date of Patent: Jan. 9, 2018

(54) INCREMENTALLY-STRETCHED ADHESIVELY-LAMINATED FILMS AND METHODS FOR MAKING THE SAME

(71) Applicant: The Glad Products Company, Oakland, CA (US)

(72) Inventors: Jack A. MacPherson, Aurora, IL (US); Scott Binger, Bridgeview, IL (US); Kenneth E. Cisek, Chicago, IL (US); Robert W. Fraser, Lombard, IL (US); Michael G. Borchardt, Naperville, IL (US); Robert T. Dorsey, Western Springs, IL (US); Shaun T. Broering, Fort Thomas, KY (US)

(73) Assignee: The Glad Products Company, Oakland, CA (US)

( * ) Notice: Subject to any disclaimer, the term of this patent is extended or adjusted under 35 U.S.C. 154(b) by 200 days.

(21) Appl. No.: 14/802,331

(22) Filed: Jul. 17, 2015

(65) Prior Publication Data
US 2015/0321461 A1    Nov. 12, 2015

Related U.S. Application Data

(60) Division of application No. 13/279,727, filed on Oct. 24, 2011, now Pat. No. 9,114,596, which is a
(Continued)

(51) Int. Cl.
*B32B 38/00* (2006.01)
*B32B 3/28* (2006.01)
(Continued)

(52) U.S. Cl.
CPC .......... *B32B 38/0012* (2013.01); *B30B 11/18* (2013.01); *B32B 3/28* (2013.01); *B32B 3/30* (2013.01); *B32B 5/147* (2013.01); *B32B 7/04* (2013.01); *B32B 7/12* (2013.01); *B32B 7/14* (2013.01); *B32B 27/00* (2013.01); *B32B 27/08* (2013.01); *B32B 27/306* (2013.01); *B32B 27/308* (2013.01); *B32B 27/32* (2013.01); *B32B 2038/0028* (2013.01); *B32B 2270/00* (2013.01); *B32B 2274/00* (2013.01);
(Continued)

(58) Field of Classification Search
None
See application file for complete search history.

(56) References Cited

U.S. PATENT DOCUMENTS

| | | | | |
|---|---|---|---|---|
| 4,153,664 A | * | 5/1979 | Sabee | B29C 51/004 264/280 |
| 6,517,936 B1 | * | 2/2003 | Ciocca | B32B 25/00 428/349 |
| 2007/0254120 A1 | * | 11/2007 | Rasmussen | B32B 3/28 428/35.7 |

* cited by examiner

*Primary Examiner* — Barbara J Musser
(74) *Attorney, Agent, or Firm* — Thomas C. Feix

(57) ABSTRACT

Incrementally-stretched adhesively-laminated films include two or more film layers adhesively bonded together. At least one of the two or more film layers is incrementally stretched. The incrementally-stretched adhesively-laminated films can have maintained or increased strength parameters despite a reduction in gauge. The incrementally-stretched adhesively-laminated films can be formed into bags for use as trash can liners or food storage. Methods of forming incrementally-stretched adhesively-laminated films include cold stretching one or more of the first and second film layers and adhesively bonding the film layers together.

20 Claims, 20 Drawing Sheets

Related U.S. Application Data continuation-in-part of application No. 12/947,025, filed on Nov. 16, 2010, now Pat. No. 8,603,609.

(60) Provisional application No. 61/261,673, filed on Nov. 16, 2009.

(51) Int. Cl.
  *B32B 3/30* (2006.01)
  *B32B 27/32* (2006.01)
  *B30B 11/18* (2006.01)
  *B32B 5/14* (2006.01)
  *B32B 7/14* (2006.01)
  *B32B 27/08* (2006.01)
  *B32B 7/04* (2006.01)
  *B32B 27/00* (2006.01)
  *B32B 7/12* (2006.01)
  *B32B 27/30* (2006.01)

(52) U.S. Cl.
  CPC ..... *B32B 2307/402* (2013.01); *B32B 2307/41* (2013.01); *B32B 2307/412* (2013.01); *B32B 2307/414* (2013.01); *B32B 2307/51* (2013.01); *B32B 2307/514* (2013.01); *B32B 2307/54* (2013.01); *B32B 2307/5825* (2013.01); *B32B 2307/7163* (2013.01); *B32B 2439/46* (2013.01); *Y10T 428/2457* (2015.01); *Y10T 428/24826* (2015.01)

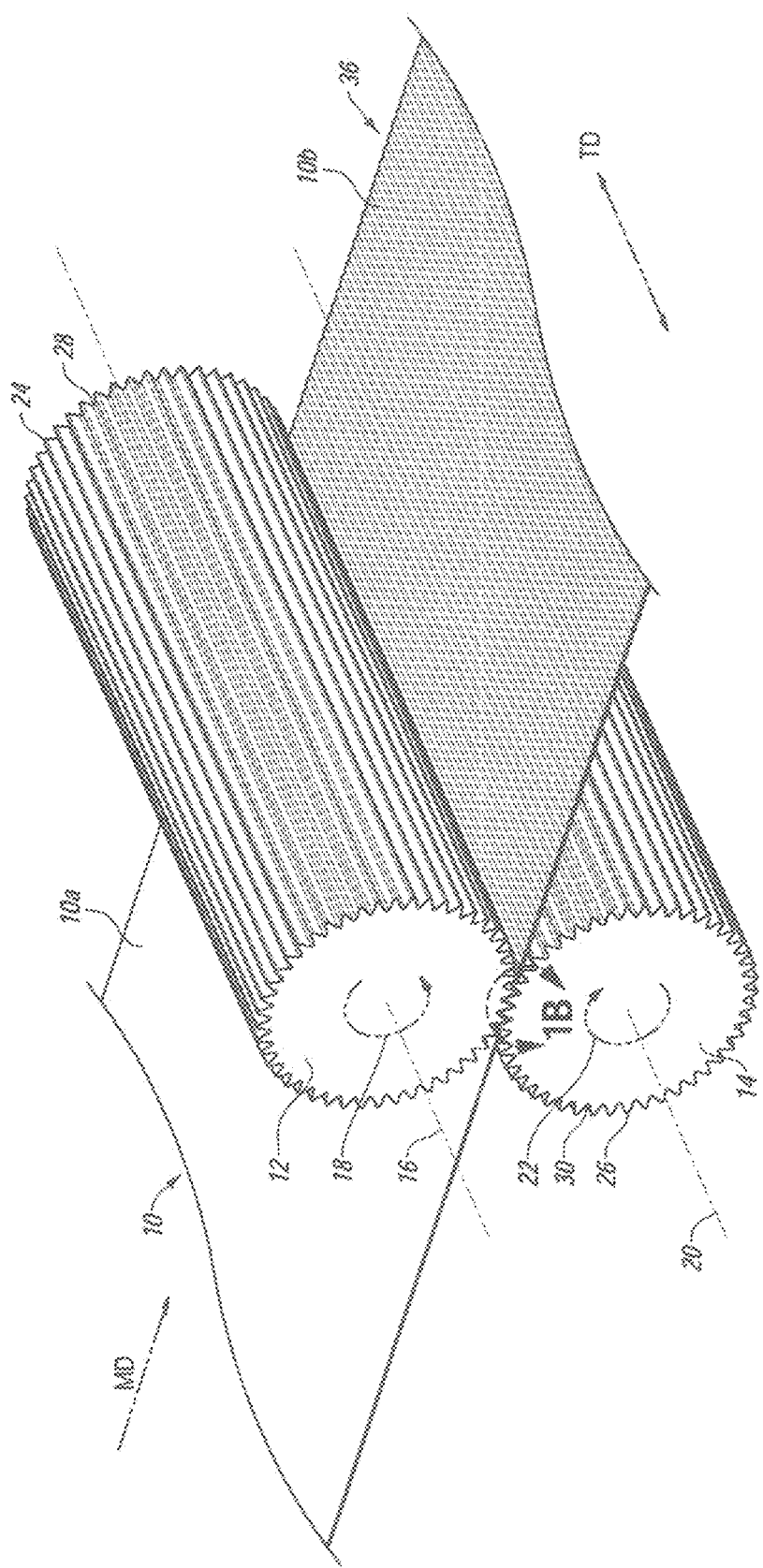

INCREMENTALLY-STRETCHED ADHESIVELY-LAMINATED FILMS AND METHODS FOR MAKING THE SAME

CROSS-REFERENCE TO RELATED APPLICATIONS

The present application is a divisional of U.S. application Ser. No. 13/279,727 filed Oct. 24, 2011, now U.S Pat. No. 9,114,596 which is a continuation in part of U.S. patent application Ser. No. 12/947,025 filed Nov. 16, 2010 and issued as U.S. Pat. No. 8,603,609 on Dec. 10, 2013, which claims the benefit of U.S. Provisional Application No. 61/261,673, filed Nov. 16, 2009. The contents of the above applications are hereby incorporated by reference in their entirety.

BACKGROUND OF THE INVENTION

1. The Field of the Invention

The present invention relates generally to thermoplastic films. Specifically, the invention relates to stretched thermoplastic films with visually distinct regions created by stretching the films.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many attempt to control manufacturing costs by decreasing the amount of thermoplastic material in a given product.

One way manufacturers may attempt to reduce production costs is to stretch the thermoplastic film, thereby increasing its surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

To MDO a film, manufacturers commonly heat the film to an elevated temperature and stretch the film in the machine direction. Commonly, manufacturers will stretch the thermoplastic film between approximately 300 to 500 percent of the film's original length or more. Unfortunately, stretching thermoplastic films in the machine direction using conventional methods can weaken the film.

Thermoplastic films have a variety of different strength parameters that manufacturers of products incorporating a thermoplastic film component may attempt to manipulate to ensure that the film is suitable for use its intended use. For example, the tensile strength of a thermoplastic film is the maximum stress that a film can withstand while being stretched before it fails. The tear resistance of a thermoplastic film is the amount of force required to propagate or enlarge a tear that has already been created in a film. Still further, impact resistance is the force required to puncture a film.

Traditionally, thinner thermoplastic films can have undesirable properties. For example, thinner thermoplastic films can have lower tensile strength, tear resistance, and impact resistance. In addition, thinner thermoplastic films can be more transparent or translucent. Consumers commonly associate thinner films with weakness. Such consumers may feel that they are receiving less value for their money when purchasing products with thinner films; and thus, may be dissuaded to purchase thinner thermoplastic films.

Manufacturers may use laminates to achieve improved overall stiffness and tear resistance. Although lamination of uniaxial layers can improve tear resistance transverse to the direction of stretching, tearing can be easily effectuated along the longitudinal axis of stretching. Biaxial orientation of laminates can improve stiffness and tear resistance in two directions, but the laminate can still be highly susceptible to tears which run longitudinally along the combination of the axes. Further, conventional biaxial orientation methods used are not easily adaptable to high speed production processes.

The weakening of a film upon stretching may dissuade manufacturers to stretch a film or use thinner films despite the potential material savings. For example, one common use of thermoplastic films is as bags for liners in trash or refuse receptacles. It is desirable to have trash bags with a high tear resistance to help prevent tearing of the trash bag and associated spilling of the contents during disposal thereof. Another common use of thermoplastic films is as flexible plastic bags for storing food items. Similar to trash bags, a high tear resistance in food storage bags can help prevent tearing of the bags and associated spilling or spoiling of food.

Accordingly, there are a number of considerations to be made in thermoplastic films and manufacturing methods.

BRIEF SUMMARY OF THE INVENTION

Implementations of the present invention solve one or more problems in the art with apparatus and methods for creating thermoplastic films with reduced gauge or thickness without unduly compromising the strength parameters of the thermoplastic films. In particular, one or more implementations include adhesively-laminated incrementally-stretched films with maintained or increased strength parameters. Such implementations can provide an overall thinner film employing a reduced amount of raw material that nonetheless has maintained or increased strength parameters.

For example, one implementation of an incrementally-stretched adhesively-laminated film can include a first film layer and a second film layer. The first film layer can have a first plurality of un-stretched regions and a first plurality of stretched regions intermittently dispersed about the first plurality of un-stretched regions. The incrementally-stretched adhesively-laminated film can further include a plurality of adhesive bonds securing the first film layer to the second film layer.

Additionally, an implementation of a thermoplastic bag can include first and second layers of thermoplastic material. The first layer can include first and second side walls joined along a bottom edge, a first side edge, and an opposing second side edge. The second layer can include first and second side walls joined along a bottom edge, a first side edge, and an opposing second side edge. One or more of the first layer and the second layer can be incrementally stretched. Also, the second layer can be positioned inside of the first layer. Furthermore, the second layer can be adhesively bonded to the first layer.

In addition to the foregoing, a method for forming an incrementally-stretched adhesively-laminated film can involve providing a first film layer comprising a thermoplastic material and providing at least a second film layer. The method can also involve cold stretching one or more of the first film layer and the second film layer incrementally. The method can additionally involve adhesively laminating the first film layer to the second film layer.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 1A illustrates a schematic diagram of a thermoplastic film being incrementally stretched by MD intermeshing rollers in accordance with one or more implementations of the present invention;

DETAILED DESCRIPTION OF THE PREFERRED EMBODIMENTS

Figure 1B:
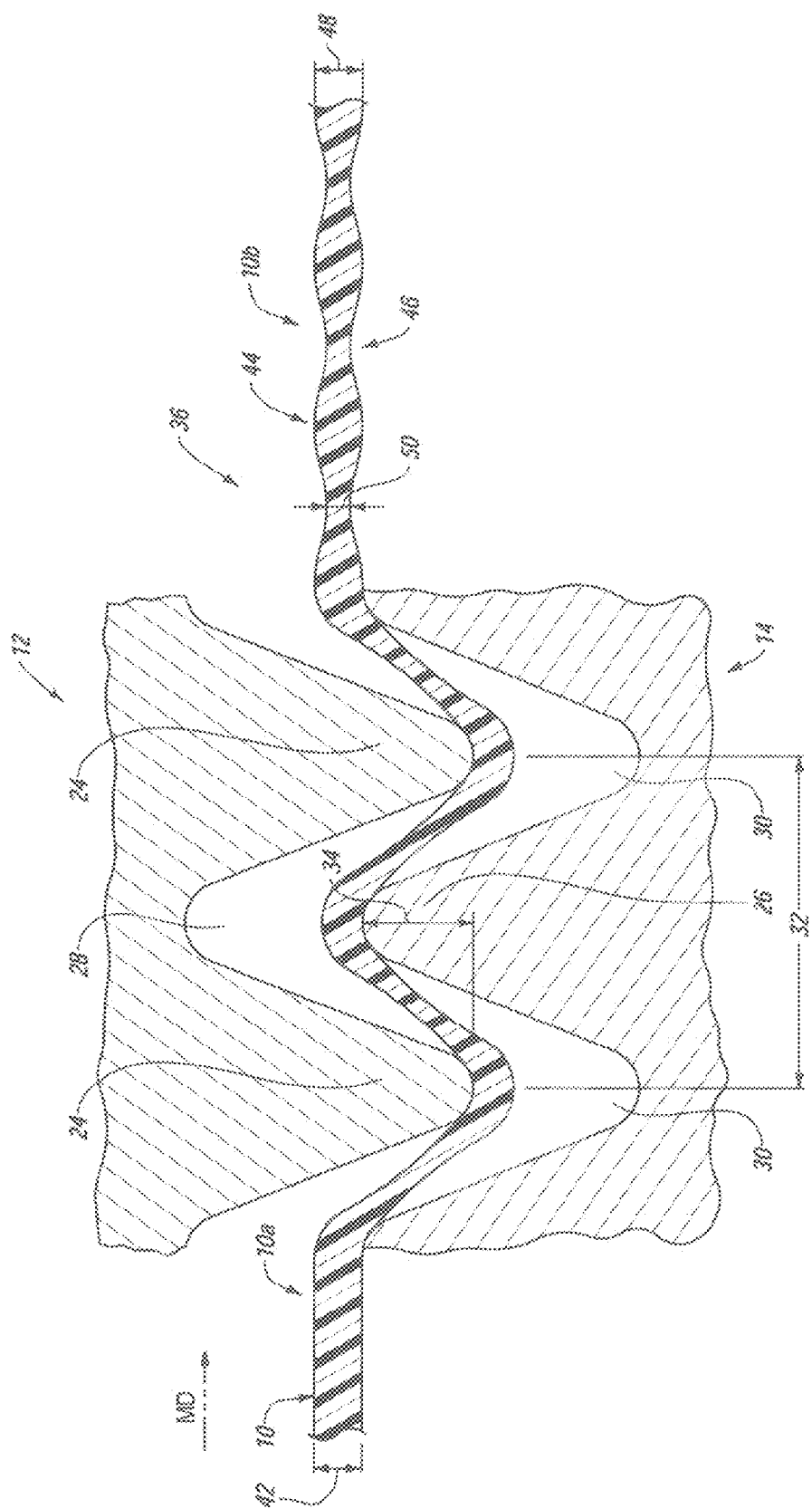
FIG. 1B illustrates an enlarged view of a portion of the thermoplastic film passing through the intermeshing rollers of FIG. 1A taken along the circle 1B of FIG. 1.

One or more implementations of the present invention include apparatus and methods for creating thermoplastic films with reduced gauge or thickness without unduly compromising the strength parameters of the thermoplastic films. In particular, one or more implementations include adhesively-laminated incrementally-stretched films with maintained or increased strength parameters. Such implementations can provide an overall thinner film employing a reduced amount of raw material that nonetheless has maintained or increased strength parameters.

Indeed, one or more implementations can provide thermoplastic films, and products made therefrom, with reduced gauge yet maintained or increased strength parameters, such as tensile strength, tear resistance, and impact resistance. Thus, one or more implementations can reduce the material needed to produce a product without compromising important material properties, such as tear resistance. One will appreciate in light of the disclosure herein that such material reductions can provide significant cost savings.

As alluded to previously, one or more implementations include films having at least a first film layer that is incrementally stretched. For example, one or more implementations of the present invention includes incrementally stretching a film layer using MD ring rolling, TD ring rolling, diagonal direction ("DD") ring rolling, embossing, or the formation of strainable networks, and combinations thereof. Incrementally stretching a film layer using the methods described herein can impart ribs or other structures to the film and increase or otherwise modify one or more of the tensile strength, tear resistance, impact resistance, or elasticity of the film.

One or more implementations further include adhesively laminated film layers. At least one of the adhesively laminated film layers can be incremental stretched. As described more fully herein below, adhesive lamination can bond two or more film layers together without altering the ribs or other structures of the incrementally-stretched film layer(s).

As used herein, the terms "lamination," "laminate," and "laminated film," refer to the process, and resulting product, made by bonding together two or more layers of film or other materials. The term "bonding," when used in reference to bonding of multiple layers of a multi-layer film, may be used interchangeably with "lamination" of the layers. According to methods of one or more implementations of the present invention, adjacent layers of a multi-layer film are laminated or bonded to one another. In one or more implementations, the lamination or bonding purposely results in a relatively weak bond between the film layers.

In particular, one or more implementations include methods of incrementally stretching and adhesively bonding film layers with the unexpected result of maintaining or increasing the strength parameters of the resulting multi-layered film. In particular, as will be described in greater detail below, one or more implementations provide synergistic effects in the resultant multi-layered film. For example, one or more implementations include incrementally-stretched and adhesively-bonded films in which one or more of the strength parameters are unexpectedly greater than the sum of the individual layers.

Implementations of the present invention include varying levels of adhesion from light bonds that are easy to peal apart to very strong bonds. In one or more implementations, the bond strength can be less than the weakest tear strength of the individual layers so that the lamination bonds will break before the film will fail. In such implementations, the adhesive bonds between the layers can come apart under stress and the individual layers can then react independently. For example, in the case of tensile strain, each film layer can react independently, leading to two peaks loads separated by elongation.

The unexpected or synergistic effects in one or more implementations can be due at least in part to the fact that energy applied to the incrementally-stretched adhesively-laminated films in the form of stresses and strains can first be absorbed through the breaking of the adhesive bonds between the film layers before causing material deformation (stretching, tearing, etc.) in the film layers. Furthermore, films of the present invention can undergo one or more film stretching processes under ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

In addition to the foregoing, one or more implementations provide stretched thermoplastic films with physical features that consumers can associate with the improved strength properties. In particular, one or more implementations include thermoplastic films with ribs or other structures extending across the film in one or more directions. The ribs can serve to notify a consumer that the thermoplastic film has been processed to increase the strength of the film.

Some consumers may associate thinner films with decreased strength. Indeed, such consumers may feel that they are receiving less value for their money when purchasing thermoplastic film products with smaller gauges. One will appreciate in light of the disclosure herein that a consumer may not readily detect that one or more incrementally-stretched films of the present invention have a reduced gauge. In particular, by imparting an alternating pattern of thick and thin ribs, the consumer may associate the thickness of the thermoplastic film with that of the thicker ribs.

Film Materials

As an initial matter, the thermoplastic material of the films of one or more implementations can include, but are not limited to, thermoplastic polyolefins, including polyethylene and copolymers thereof, and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins. Various other suitable polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof. Additionally, the thermoplastic materials of one or more films of the present invention can include a suitable amount of a cling agent, such as polyisobutylene, to control the level of lamination during the lamination process.

In at least one implementation of the present invention, the film can include linear low density polyethylene. The term "linear low density polyethylene" (LLDPE) as used herein is defined to mean a copolymer of ethylene and a minor amount of an alkene containing 4 to 10 carbon atoms, having a density of from about 0.910 to about 0.926, and a melt index (MI) of from about 0.5 to about 10. For example, some implementations of the present invention can use an octene co-monomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920).

One will appreciate that the present invention is not limited to LLDPE, and can include "low density polyethylene" (LDPE), and "very low density polyethylene" (VLDPE). The term "low density polyethylene" (LDPE) as used herein is defined to mean an ethylene-containing polymer having a density of about 0.926 or lower and a MI of about 7. The term "very low density polyethylene" (VLDPE) as used herein is defined to mean an ethylene-based hexane copolymer having a density of from about 0.890 to about 0.915 and a MI of from about 3 to about 17. Additionally, in one or more implementations, the film can comprise high density polyethylene. The term "high density polyethylene" (HDPE) as used herein is defined to mean an ethylene-containing polymer having a density of 0.940 or higher. (Density (d) is expressed as g/cm 3). Indeed, films made from any of the previously mentioned thermoplastic materials or combinations thereof can be suitable for use with the present invention.

Indeed, implementations of the present invention can include any flexible or pliable thermoplastic material which may be formed or drawn into a web or film. As described above, the film includes a plurality of layers of thermoplastic films. Each individual film layer may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. For examples, the films can include pigments, slip agents, anti-block agents, tackifiers, voiding agents, or combinations thereof. The pigments can include $TiO_2$, or other pigments that can impart a color and/or opacity to the film.

Indeed, implementations of the present invention can include any flexible or pliable thermoplastic material which may be formed or drawn into a web or film. Furthermore, the thermoplastic materials may include a single layer or multiple layers. Examples of multilayered films suitable for use with one or more implementations of the present invention include coextruded multilayered films, multiple films continuously laminated together, and multiple films partially or discontinuously laminated together. The thermoplastic material may be opaque, transparent, translucent, or tinted. Furthermore, the thermoplastic material may be gas permeable or impermeable.

One will appreciate in light of the disclosure herein that manufacturers may form the individual films or webs to be discontinuously bonded together so as to provide improved strength characteristics using a wide variety of techniques. For example, a manufacturer can form a precursor mix of the thermoplastic material and one or more additives. The manufacturer can then form the film(s) from the precursor mix using conventional flat or cast extrusion or coextrusion to produce monolayer, bilayer, or multilayered films.

It will be understood that where two or more layers are coextruded together, the resulting film will be discontinuously bonded to another film at a later stage to provide the benefits associated with the present invention. Similarly, where a monolayer film is produced, the monolayer will later be discontinuously bonded to another film to provide the increased strength characteristics associated with the present invention.

Alternative to conventional flat or cast extrusion processes, a manufacturer can form the films using other suitable processes, such as, a blown film process to produce monolayer, bilayer, or multilayered films, which are similarly discontinuously bonded with another film layer at a later stage as will be described hereinafter. If desired for a given end use, the manufacturer can orient the films by trapped bubble, tenterframe, or other suitable processes. Additionally, the manufacturer can optionally anneal the films thereafter.

In one or more implementations, the films of the present invention are blown film or cast film. Blown film and cast film is formed by extrusion. The extruder used can be of a conventional design using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment. In one or more implementations, a manufacturer can use multiple extruders to supply different melt streams, which a feed block can order into different channels of a multi-channel die. The multiple extruders can allow a manufacturer to form a multi-layered film with layers having different compositions.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

As used herein, the term "starting gauge" or "initial gauge" refers to the average distance between the major surfaces of a film before it is incrementally stretched so as to discontinuously bond adjacent layers together. Of course, it is also possible to stretch one or more of the individual layers before they are discontinuously bonded together. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

As alluded to earlier, one or more implementations of the present invention include at least a first incrementally-stretched film layer adhesively laminated to at least a second film layer. The second film layer may be incrementally stretched, embossed, un-stretched, machine direction oriented, or a combination thereof. Thus, one or more film layers of a multi-layered incrementally-stretched adhesively-laminated thermoplastic film can include MD ring rolling, TD ring rolling, DD ring rolling, embossing, or the formation of strainable networks, and combinations thereof. Each of the foregoing types of incremental stretching is described below.

Referring now to the Figures, FIGS. 1A and 1B illustrate one exemplary process of incrementally stretching a thermoplastic film. In particular, FIGS. 1A and 1B illustrate an MD ring rolling process that incrementally stretches a thermoplastic film 10 by passing the film 10 through a pair of MD intermeshing rollers 12, 14. The MD ring rolling processes stretches the film 10 in the machine direction.

As shown by FIGS. 1A and 1B, the first roller 12 and the second roller 14 can each have a generally cylindrical shape. The rollers 12, 14 may be made of cast and/or machined metal, such as, steel, aluminum, or any other suitable material. The rollers 12, 14 can rotate in opposite directions about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The intermeshing rollers 12, 14 can closely resemble fine pitch spur gears. In particular, the rollers 12, 14 can include a plurality of protruding ridges 24, 26. The ridges 24, 26 can extend along the rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A and 1B also illustrate that grooves 28, 30 can separate adjacent ridges 24, 26. The configuration of the ridges 24, 26 and grooves 28, 30 can dictate the amount stretching a film passing through the MD intermeshing rollers 12, 14 undergoes.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different rollers 12, 14 during intermeshing. The ratio of DOE 34 to pitch 32 can determine, at least in part, the amount of stretch imparted by a pair of intermeshing rollers 12, 14.

As the thermoplastic film 10 passes between the intermeshing rollers 12, 14, the ridges 24, 26 can incrementally stretch the film 10 in the machine direction. Additionally, the rollers 12, 14 can impart or form a generally striped pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

FIGS. 1A and 1B illustrate that the pre-stretched film 10a comprises a single-layered film. In one or more implementations, the individual films each comprises a plurality of laminated layers. Such layers may be significantly more tightly bonded together than the adhesive bonding provided top bond films together. Both tight and relatively weak lamination can be accomplished by joining layers by mechanical pressure, joining layers with adhesives, joining with heat and pressure, and even spread coating and extrusion coating. Adjacent sub-layers of an individual layer may be coextruded.

In any event, FIGS. 1A and 1B illustrate the intermeshing rollers 12, 14 can process the pre-stretched film 10a into an MD incrementally-stretched film 10b. As previously mentioned, the MD incrementally-stretched film 10b can include a striped pattern 36. The striped pattern 36 can include alternating series of "un-stretched" regions or thicker ribs 44 and stretched regions or thinner ribs 46. In one or more implementations, the "un-stretched" regions of the incrementally-stretched films may be stretched to a small degree. In any event, the "un-stretched" regions can be stretched significantly less compared to the stretched regions.

The thicker ribs or un-stretched regions 44 can have a first average thickness or gauge 48. The first average gauge 48 can be approximately equal to the starting gauge 42. In one or more implementations, the first average gauge 48 can be less than the starting gauge 42. The thinner ribs or stretched regions 46 can have a second average thickness or gauge 50. In one or more implementations, the second average gauge 50 can be less than both the starting gauge 42 and the first average gauge 48. In one or more implementations, the thicker ribs or un-stretched regions 44 and the thinner ribs or stretched regions 46 are not corrugated and lie in the same plane to give a ribbed flat film.

One will appreciate in light of the disclosure herein that the striped pattern 36 may vary depending on the method used to incrementally stretch the film 10. To the extent that MD ring rolling is used to incrementally stretch the film 10, the striped pattern 36 on the film 10 can depend on the pitch 32 of the ridges 24, 26, the DOE 34, and other factors.

Figure 2:
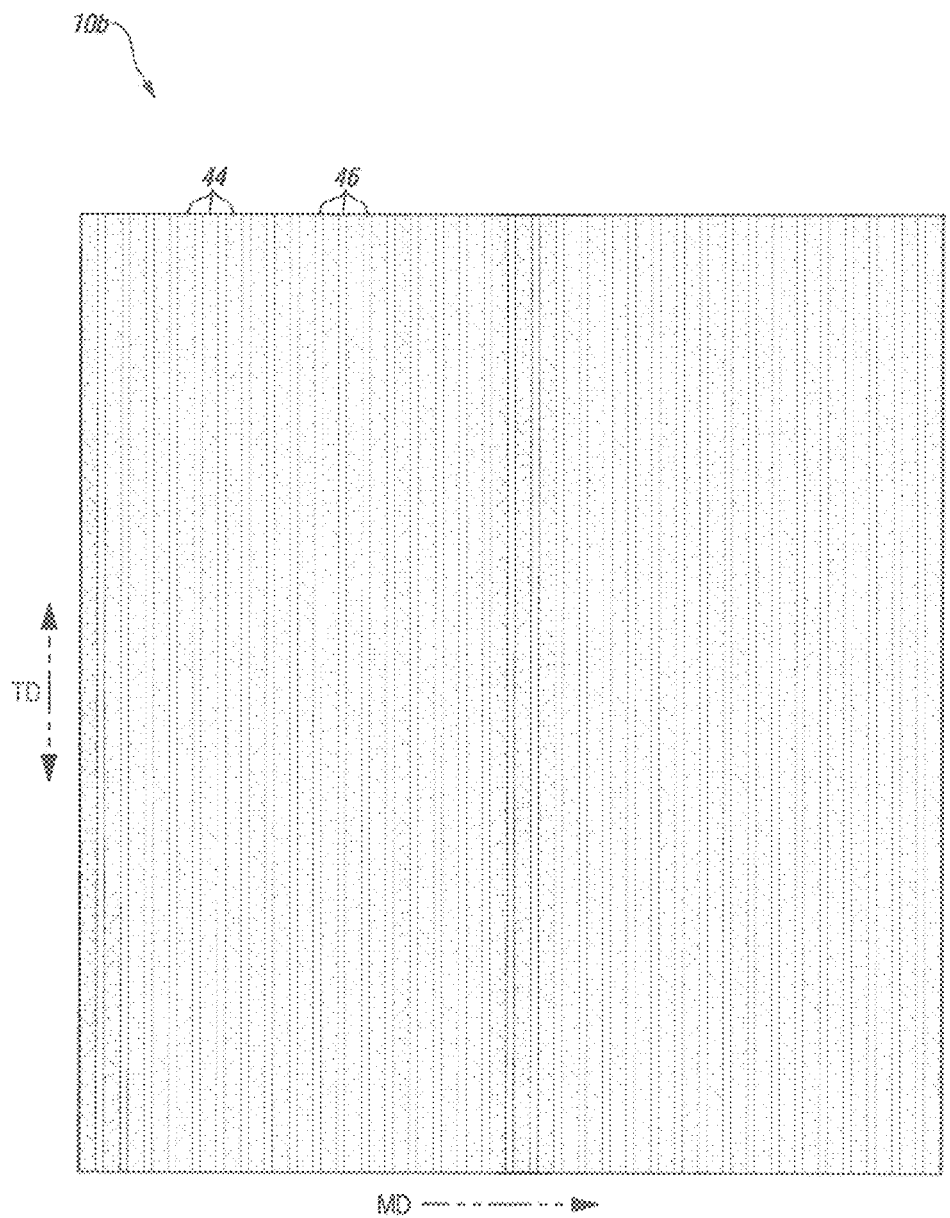
FIG. 2 illustrates a view of an MD incrementally stretched film created by passing through the intermeshing rollers of FIG. 1.

FIG. 2 illustrates a top view of the MD incrementally-stretched film 10b. The ribs 44, 46 can extend across the film 10b in a direction transverse (i.e., transverse direction) to a direction in which the film was extruded (i.e., machine direction). The pitch 32 and the DOE 34 of the ridges 24, 26 of the MD intermeshing rollers 12, 14 can determine the width and spacing of the ribs 44, 46. Thus, as explained in greater detail below, by varying the pitch 32 and/or DOE 34, the width and/or spacing of the ribs 44, 46, the amount of stretching the film undergoes, and the effects of the stretching on the physical properties can be varied.

The ribs 44, 46 or ribbed pattern 36, can provide a pleasing appearance and connote strength to a consumer. For example, the stripped pattern 36 can signify that the MD incrementally-stretched film 10b has undergone a physical transformation to modify one or more characteristics of the MD incrementally-stretched film 10b. For example, MD ring rolling the film 10 can increase or otherwise modify one or more of the tensile strength, tear resistance, impact resistance, or elasticity of the MD incrementally-stretched film 10b. The ribbed pattern 36 can signify the physical transformation to a consumer.

Figure 3:
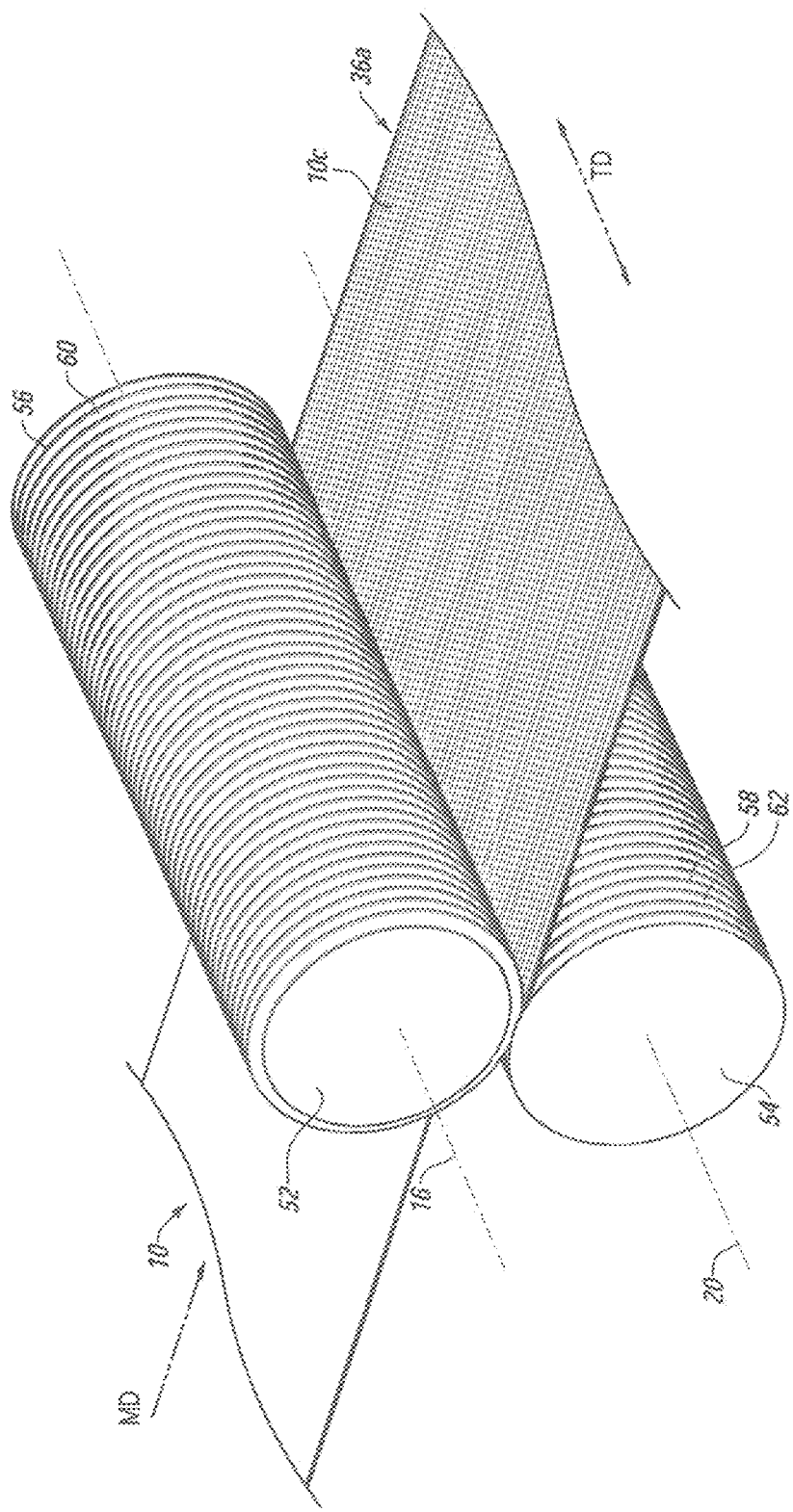
FIG. 3 illustrates a schematic diagram of a thermoplastic film being incrementally stretched by TD intermeshing rollers in accordance with one or more implementations of the present invention.

As mentioned previously, MD ring rolling is one exemplary method of incrementally stretching a thermoplastic film to create visually-distinct stretched regions in accordance with an implementation of the present invention. TD ring rolling is another suitable method of incrementally stretching a film to create visually-distinct stretched regions. For example, FIG. 3 illustrates a TD ring rolling process that incrementally stretches a thermoplastic film 10 by passing the film 10 through a pair of TD intermeshing rollers 52, 54. A TD ring rolling processes (and associated TD intermeshing rollers 52, 54) can be similar to the MD ring rolling process (and associated MD intermeshing rollers 12, 14) described herein above, albeit that the ridges 56, 58 and grooves 60, 62 of the TD intermeshing rollers 52, 54 can extend generally orthogonally to the axes of rotation 16, 20.

Thus, as shown by FIG. 3, as the thermoplastic film 10 passes between the intermeshing rollers 52, 54, the ridges 56, 58 can incrementally stretch the film 10 in the transverse direction. In particular, as the film 10 proceeds between the intermeshing rollers 52, 54, the ridges 56, 58 can impart or form a striped pattern 36a into the film 10 to form a TD incrementally-stretched film 10c.

Figure 4:
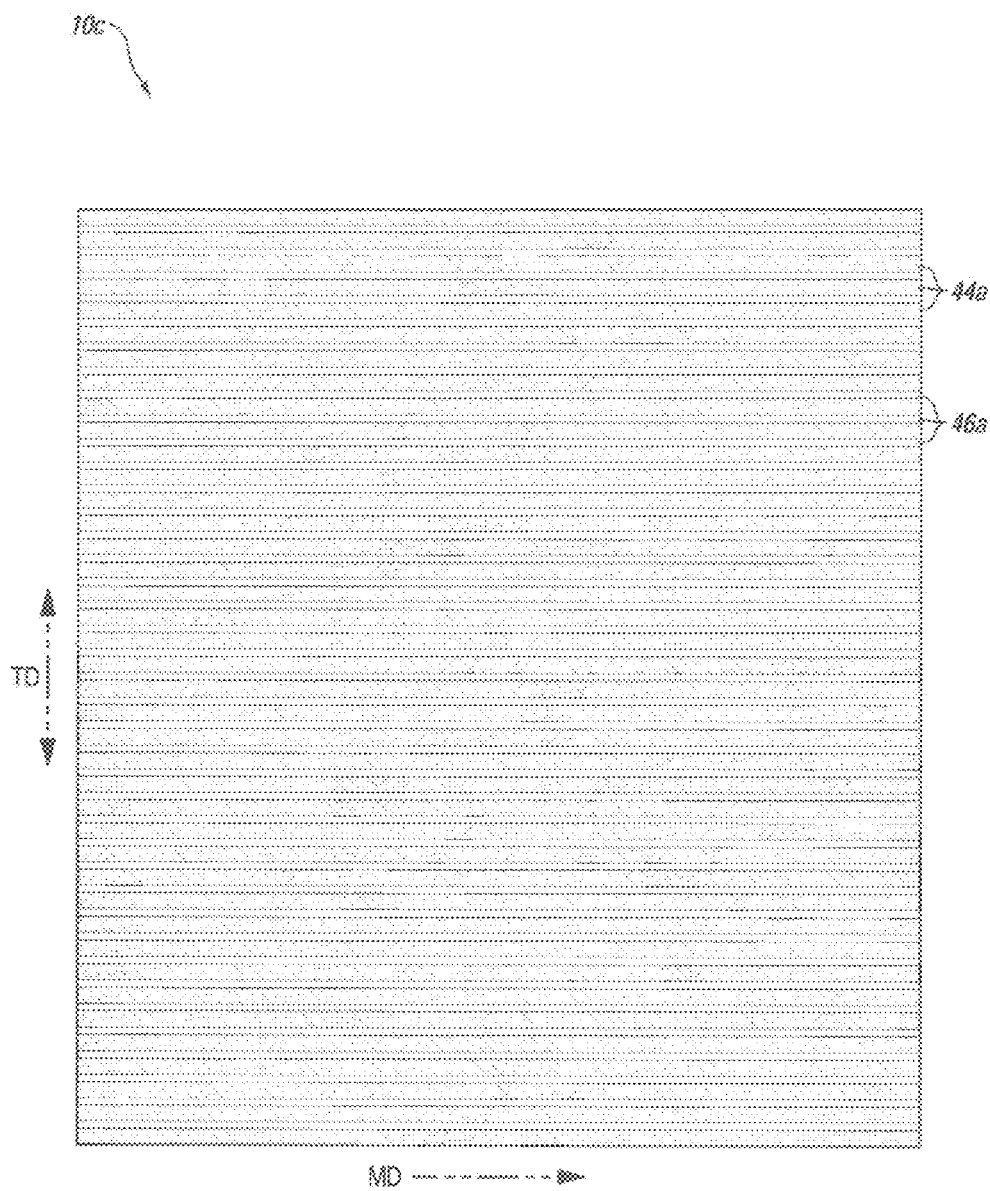
FIG. 4 illustrates a view of a TD incrementally stretched film created by passing through the intermeshing rollers of FIG. 3.

FIG. 4 illustrates a view of the TD incrementally-stretched film 10c. The striped pattern 36a can include alternating series of thicker ribs or un-stretched regions 44a and thinner ribs stretched regions 46a. In one or more implementations, the thicker ribs or un-stretched regions 44a and the thinner ribs or stretched regions 46a are not corrugated and lie in the same plane to give a ribbed flat film. The incremental stretching of the film 10 in the TD direction can modify one or more of the tensile strength, tear resistance, impact resistance, or elasticity of the TD incrementally-stretched film 10c. The striped pattern 36a can signify the transformation to a consumer.

Additionally, FIG. 4 illustrates that the stretched regions 46a can include ribs that extend across the TD incrementally-stretched film 10c in the machine direction. As shown by FIG. 4, the thinner ribs or stretched regions 46a can extend across the entire width of the TD incrementally-stretched film 10c. In alternative implementations, thinner ribs or stretched regions 46a can extend across only a portion of the TD incrementally-stretched film 10c. Similar to MD ring rolling, the pitch and the DOE of the ridges 56, 58 of the intermeshing rollers 52, 54 can determine the width and spacing of the ribs or stretched regions 46a.

Figure 5:
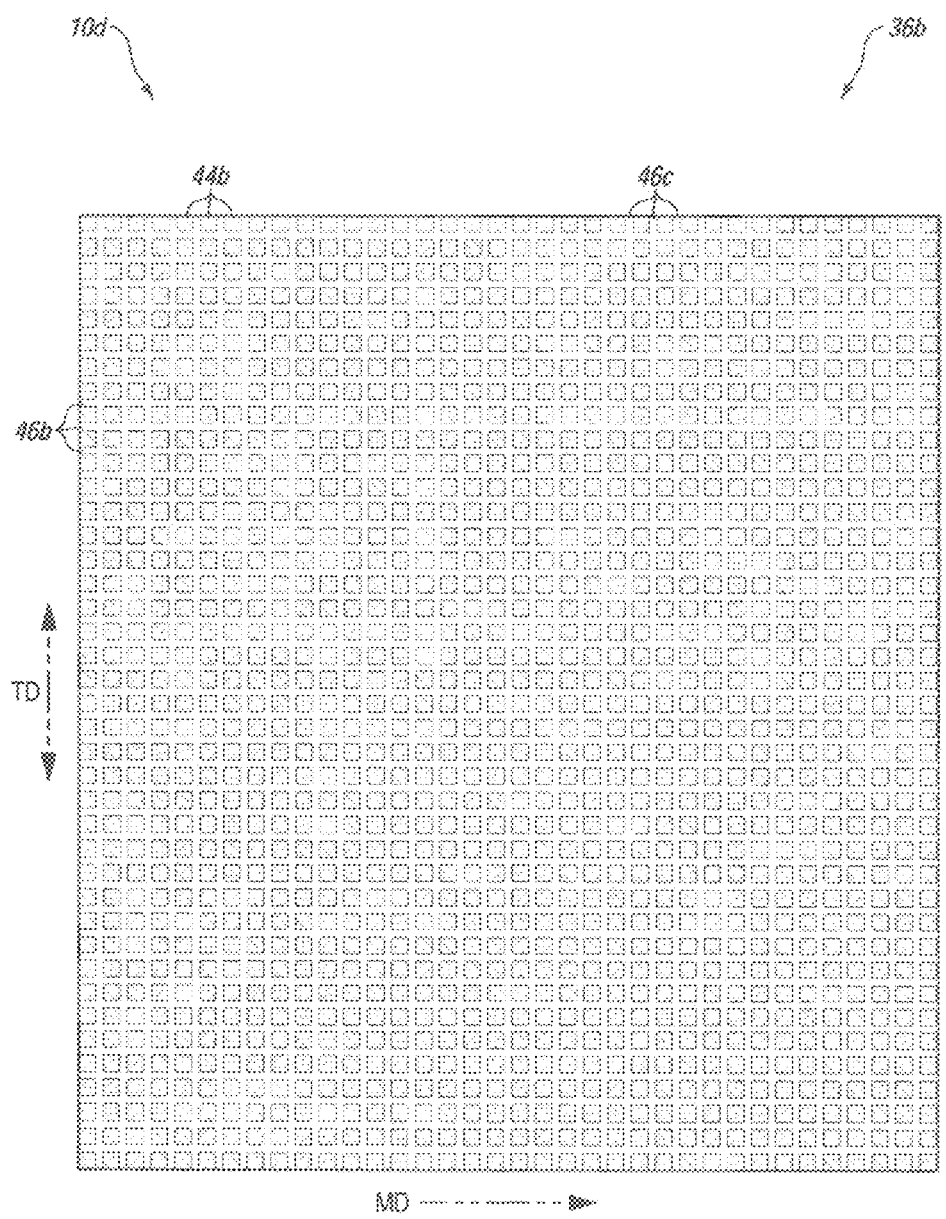
FIG. 5 illustrates a view of an MD and TD incrementally stretched film created by the intermeshing rollers of both FIG. 1 and FIG. 3.

In still further implementations, a film 10 can undergo both an MD ring rolling process and a TD ring rolling process to create an MD and TD incrementally stretched film. For example, FIG. 5 illustrates a top view of an MD and TD incrementally-stretched film 10d. The MD and TD incrementally-stretched film 10d can have a checker-board like pattern 36b. The checker-board like pattern 36b can include alternating series of thicker ribs or un-stretched regions 44b and thinner ribs or stretched regions 46b, 46c. The stretched regions 46b, 46c can include ribs 46b that extend along the film 10c in the machine direction, and ribs 46c that extend along the film in the transverse direction. As shown by FIG. 5, in one or more implementations, the aspect ratio of the rows and columns of the stretched regions 46b, 46c can be approximately 1 to 1. In alternative implementations, the aspect ratio of the rows and columns of the rows and columns of the stretched regions 46b, 46c can be greater or less than 1 to 1, as explained in greater detail in relation to FIG. 13. In one or more implementations, the thicker ribs or un-stretched regions 44b and the thinner ribs or stretched regions 46b, 46c are not corrugated and lie in the same plane to give a ribbed flat film.

The incrementally-stretched film regions created by MD and TD ring rolling can allow for even greater material savings by further increasing the surface area of a given portion of film. Additionally, MD and TD ring rolling can provide properties or advantages not obtained by MD or TD ring rolling alone. Thus, checker-board like pattern 36b created by the stretched regions 46b, 46c can signify these transformations to a consumer.

Figure 6:
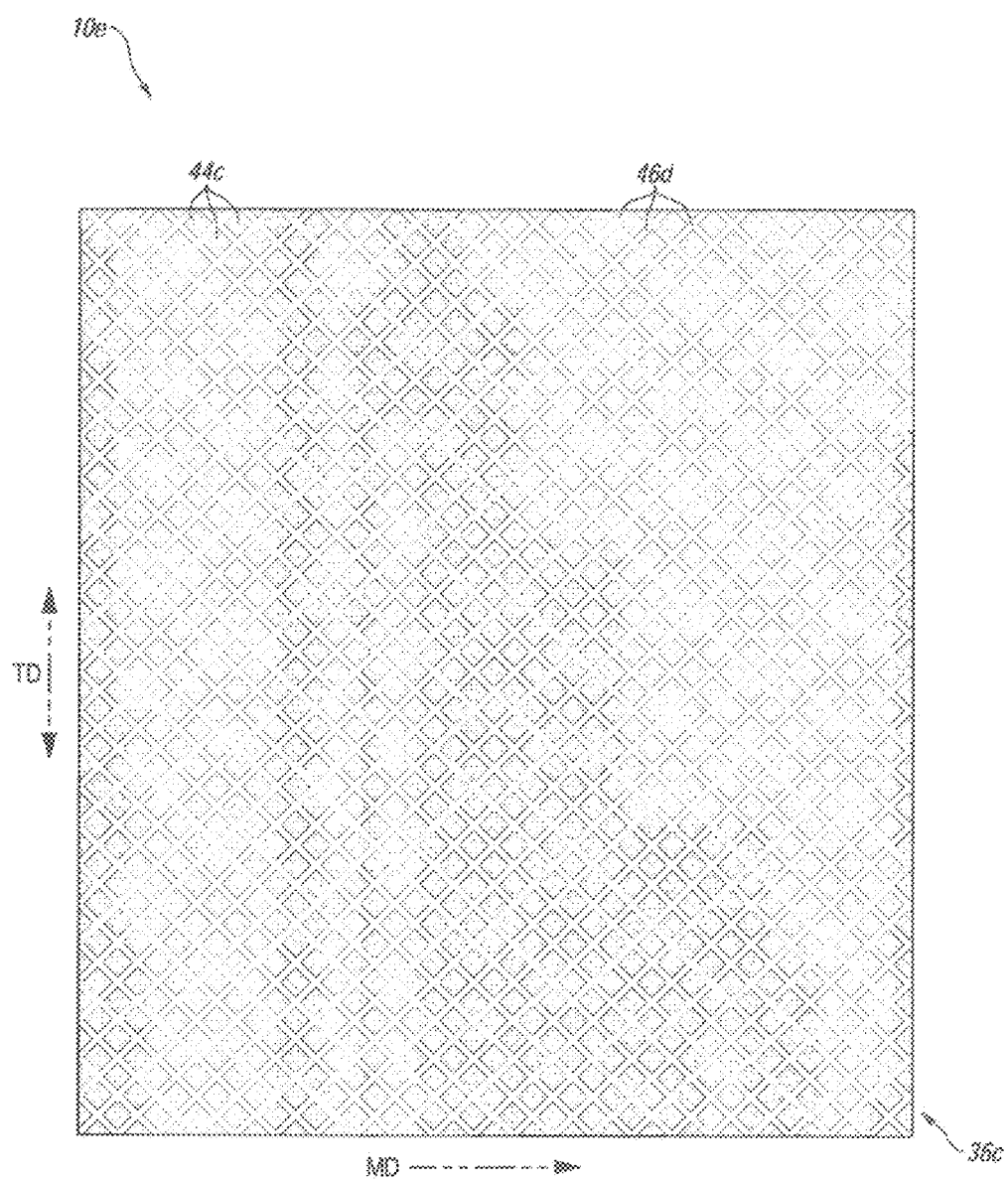
FIG. 6 illustrates a view of an incrementally stretched film created by passing through diagonal direction intermeshing rollers in accordance with one or more implementations of the present invention.

In yet further implementations, a manufacturer can use DD ring rolling to incrementally stretch a thermoplastic film to create visually-distinct stretched regions. A DD ring rolling processes (and associated DD intermeshing rollers) can be similar to the MD ring rolling process (and associated MD intermeshing rollers 12, 14) described herein above, albeit that the ridges and grooves of the DD intermeshing rollers can extend at an angle relative to the axes of rotation. For example, FIG. 6 illustrates a view of a diagonally incrementally-stretched film 10e created by DD ring rolling. The diagonally incrementally-stretched film 10e can have a diamond pattern 36c. The diamond pattern 36c can include alternating series of diamond-shaped ribs or un-stretched regions 44c and stretched regions 46d. The stretched regions can include ribs 46d oriented at an angle relative to the transverse direction such that the ribs 46d are neither parallel to the transverse or machine direction. The illustrated configuration may be achieved with two ring rolling operations, similar to that of FIG. 5, but in which the DD ring rollers of each operation are angularly offset relative to one another (e.g., one providing an angle of about 45° off MD ring rolling, the other providing an angle of about 45° off TD ring rolling). In one or more implementations, the thicker ribs or un-stretched regions 44c and the thinner ribs or stretched regions 46d are not corrugated and lie in the same plane to give a ribbed flat film.

In accordance with another implementation, a structural elastic like film (SELF) process may be used to create a thermoplastic film with strainable networks. As explained in greater detail below, the strainable networks can include visually-distinct stretched regions. U.S. Pat. Nos. 5,518,801; 6,139,185; 6,232,647; 6,394,651; 6,394,652; 6,513,975; 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 7:
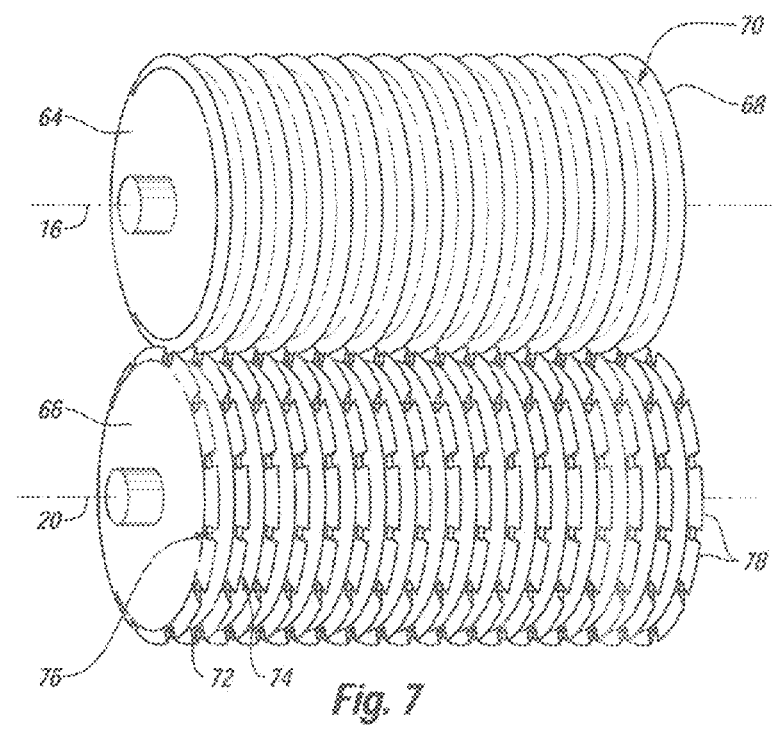
FIG. 7 illustrates a schematic diagram of a set of intermeshing rollers used to impart strainable networks into a film in accordance with one or more implementations of the present invention.

FIG. 7 illustrates a pair of SELF'ing intermeshing rollers 64, 66 for creating strainable networks in a film. The first SELF'ing intermeshing roller 64 can include a plurality of ridges 68 and grooves 70 extending generally radially outward in a direction orthogonal to an axis of rotation 16. Thus, the first SELF'ing intermeshing roller 64 can be similar to a TD intermeshing roller 52, 54. The second SELF'ing intermeshing roller 66 can include also include a plurality of ridges 72 and grooves 74 extending generally radially outward in a direction orthogonal to an axis of rotation 20. As shown by FIG. 7; however, the ridges 72 of the second SELF'ing intermeshing roller 66 can include a plurality of notches 76 that define a plurality of spaced teeth 78.

Figure 8:
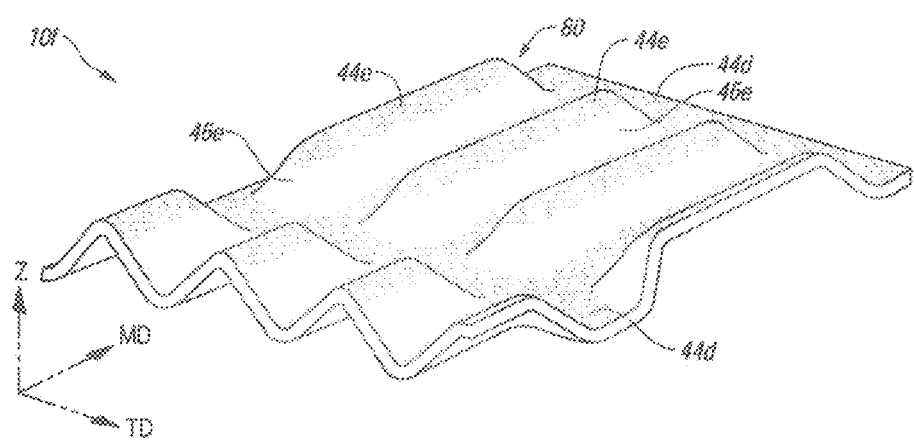
FIG. 8 illustrates a view of an incrementally stretched film including strainable networks created by passing through the intermeshing rollers of FIG. 7.

Referring now to FIG. 8, an incrementally-stretched film with strainable networks 10f created using the SELF'ing intermeshing rollers 64, 66 is shown. In particular, as the film passes through the SELF'ing intermeshing rollers 64, 66, the teeth 78 can press a portion of the web out of plane to cause permanent, deformation of a portion of the film in the Z-direction. On the other hand the portions of the film that pass between the notched regions 76 and the teeth 78 will be substantially unformed in the Z-direction, resulting in a plurality of deformed, raised, rib-like elements 80. The length and width of rib-like elements can depends on the length and width of teeth 78, and thus, can vary based on a desired pattern or desired result film property.

As shown by FIG. 8, the strainable network of the incrementally-stretched film 10f can include first thicker ribs or un-stretched regions 44d, second thicker ribs or un-stretched regions 44e, and thinner ribs or stretched transitional regions 46e connecting the first and second un-stretched regions 44d, 44e. The second un-stretched regions 44e and the stretched regions 46e can form the raised rib-like elements 80 of the strainable network. The stretched regions 46e can be discontinuous or be separated as they extend across the incrementally-stretched film with strainable networks 10f in both transverse and machine directions. This is in contrast to ribs that extend continuously across a film in one of the machine and transverse directions.

Figure 9:
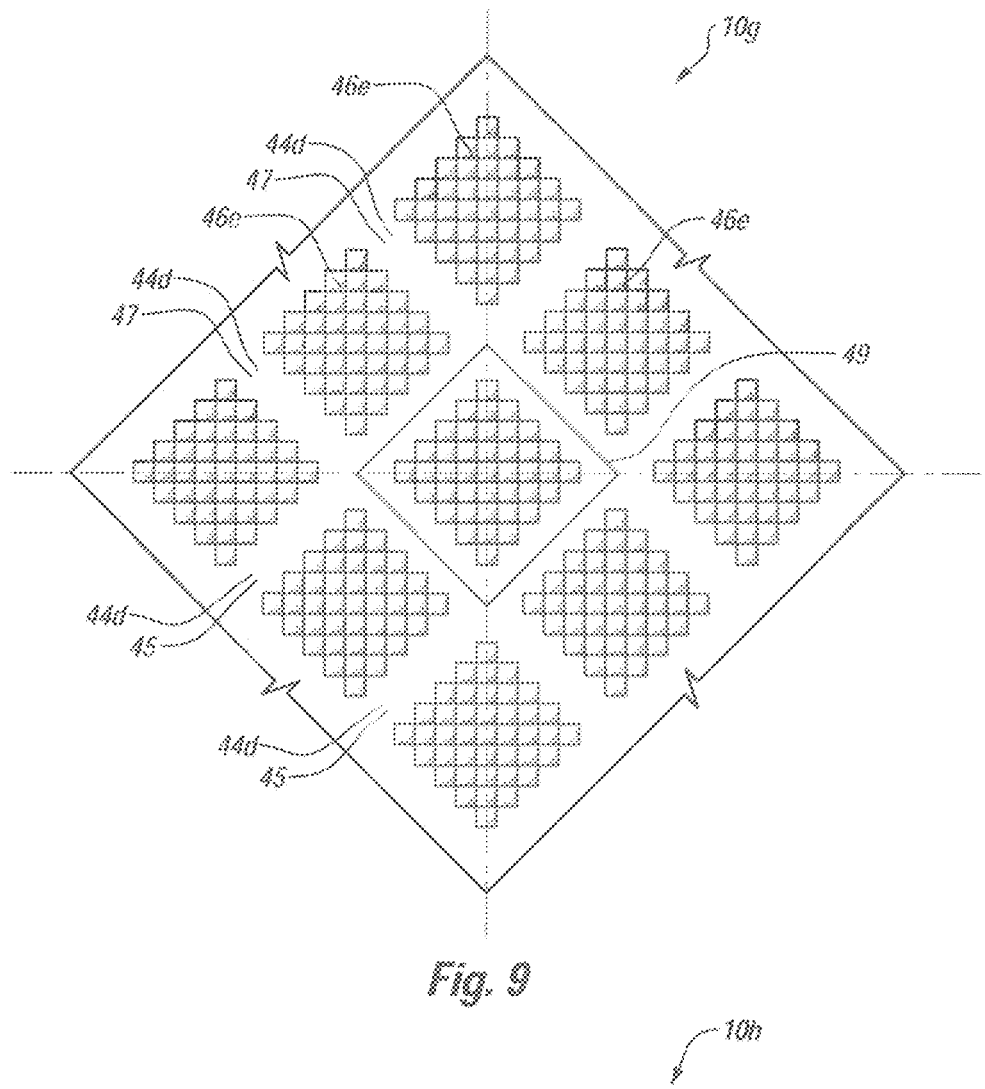
FIG. 9 illustrates a view of another incrementally stretched film including strainable networks in accordance with one or more implementations of the present invention.

One will appreciate in light of the disclosure herein that the pattern of the strainable network of FIG. 8 is only one pattern suitable for use with the present invention. For example, FIG. 9 illustrates another strainable network pattern that can include incrementally stretched regions. In particular, FIG. 9 illustrates an incrementally-stretched film 10g with strainable networks. The strainable networks include a plurality of un-stretched regions 44d that define a first region and a plurality of stretched regions 46e that define a second region. Portions of the un-stretched regions 44d, indicated generally as 45, extend in a first direction and are suitably substantially linear. Remaining portions of the un-stretched regions 44d, indicated generally as 47, extend in a second direction that is substantially perpendicular to the first direction, and the remaining portions 47 of the un-stretched regions 44d are suitably substantially linear.

In one or more implementations, the first direction is perpendicular to the second direction. Alternatively, other angular relationships exist between the first direction and the second direction. Suitably, the angles between the first and second directions range from about 45° to about 135°. In one or more implementations the angles between the first and second direction is 90°. Intersecting sections of the portions 45 and 47 of the un-stretched regions 44d form boundaries 49 (only one shown in FIG. 9), indicated by a phantom line in FIG. 9, which completely surround the stretched areas 46e. It should be understood that the boundaries 49 are not limited to the square shape illustrated herein and that boundaries 49 may comprise other shapes.

One or more implementations can include strainable network patterns other than those shown by FIGS. 8 and 9, or combinations of various patterns. Such patterns can include, but are not limited to, intermeshing circles, squares, diamonds, hexagons, or other polygons and shapes. Additionally, one or more implementations can include stretched regions arranged in patterns that are combinations of the illustrated and described patterns/shapes. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine or transverse directions.

In addition to ring rolling and SELFing, one or more implementations of include using embossing, stamping, and other methods of incrementally stretching a film. In any event, one or more implementations include incrementally stretching a film to thin and/or modify the strength parameters of the film. As alluded to earlier, implementations can further include adhesively laminating an incrementally-stretched film to another film (either un-stretched, incrementally stretched, MDO, or otherwise stretched).

Figure 10:
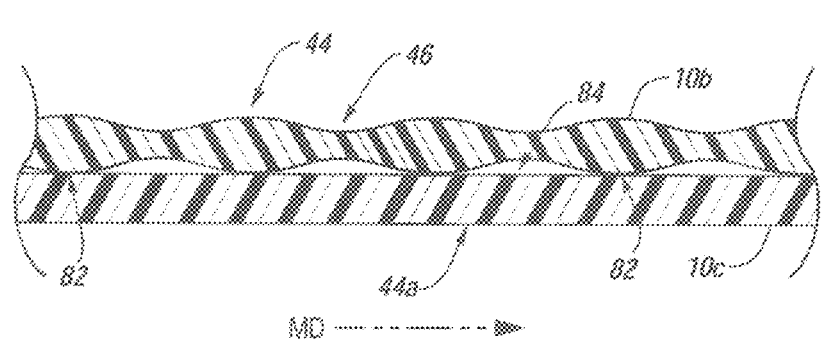
FIG. 10 illustrates a cross-sectional view of an adhesively-laminated incrementally-stretched film in accordance with one or more implementations of the present invention.

For example, FIG. 10 illustrates a cross-sectional view of incrementally-stretched adhesively-laminated film 10h. The incrementally-stretched adhesively-laminated film 10h includes an MD incrementally-stretched film 10b adhesively laminated to a TD incrementally-stretched film 10c. In particular, FIG. 10 illustrates that the MD incrementally-stretched film 10b is adhesively laminated to the TD incrementally-stretched film 10c by bonds or bond areas 82. The bond areas 82 can be separated in one or more implementations by un-bonded areas 84.

One will appreciate in light of the disclosure herein that altering the spacing and/or width of the bond areas 82 can affect the overall strength of the incrementally-stretched adhesively-laminated film 10h. For example, providing more bonded surface area relative to the un-bonded surface area can increase the density of such bonds that can absorb forces, increasing the film strength. In particular, the breaking of the bonds 82 between the adjacent layers 10b, 10c can absorb forces, preventing such forces from contributing to failing of the film 10h. Such action can provide increased strength to the film. In one or more implementations, the lamination bond includes a bond strength that is advantageously less than the tear strength of each of the individual films so as to cause the lamination bond to fail prior to failing of the film layers.

In particular, strains applied to an incrementally-stretched adhesively-laminated film of one or more implementations can cause the bonds 82 to fail (failure of the chemical bond created by the adhesive) before either of the individual layers undergo molecular-level deformation. For example, an applied strain can pull the bonds 82 apart prior to any molecular-level deformation (stretching, tearing, puncturing, etc.) of the films 10b, 10c. The chemical failure of the bonds can result in less resistive forces to an applied strain than that exhibited by molecular-level deformation of the films.

One will appreciate in light of the disclosure herein that, in additional implementations, the pre-laminated films 10b, 10c can include two or more joined layers. For example, the adhesively bonded layers of an incrementally-stretched adhesively-laminated film can comprise two or more coextruded layers or two or more continuously laminated layers. In addition to the possible compositional differences between layers (e.g., 10b, 10c) of a given incrementally-stretched adhesively-bonded film (e.g., 10h), the different film layers can have differing gauges or thicknesses.

The bond areas 82 shown in FIG. 10 bond the films 10b, 10c together at the intersections of the thicker TD extending ribs 44 of MD stretched film 10b and the thicker MD extending ribs 44a of TD stretched film 10c. The bond areas 82 are discontinuous in both the machine direction and the transverse direction, and thus, form a discontinuous lamination. Discontinuous lamination refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

In addition to discontinuous lamination, incrementally-stretched adhesively-laminated films of one or more implementations can include partially discontinuous lamination. Partially discontinuous lamination refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

For instance, an example of an incrementally-stretched adhesively-laminated film including partially discontinuous lamentation is two MD incrementally-stretched films 10b adhesively laminated together along the thicker 44 TD extending ribs. Another example is two TD incrementally-stretched films 10c adhesively laminated along the thicker 44a MD extending ribs.

One will appreciate in light of the disclosure herein that the bond areas of an incrementally-stretched adhesively-laminated film are not limited to being located along the thicker ribs of an incrementally stretched film. For example, in one or more implementations the bond areas can secure the stretched areas (i.e., thinner ribs) of one film to stretched or un-stretched areas of another film. For example, adhesive bonds can connect the thicker ribs of one film to the thinner ribs of the other film.

Figure 11:
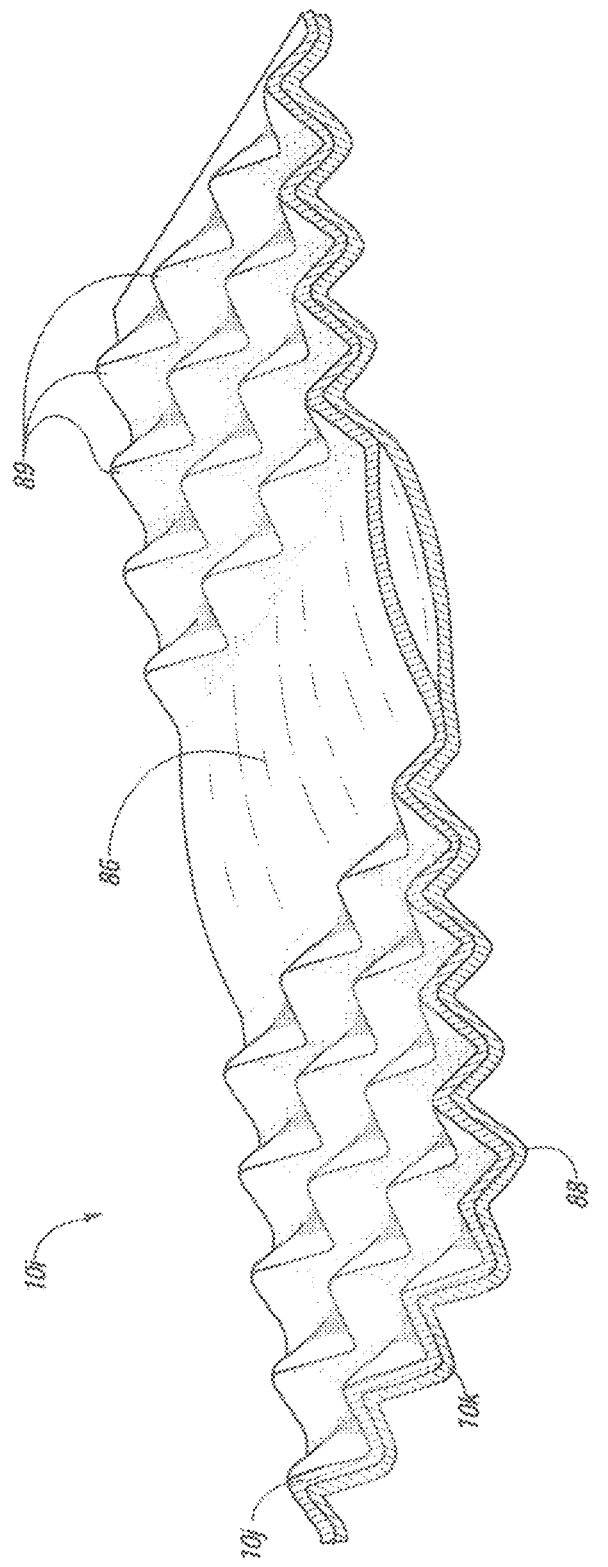
FIG. 11 illustrates a perspective view of another adhesively-laminated incrementally-stretched in accordance with one or more implementations of the present invention.

FIG. 11 illustrates another incrementally-stretched adhesively-laminated film 10i. The incrementally-stretched adhesively-laminated film 10i includes first and second films 10j, 10k each comprising multi-directional strainable networks. The multi-directional strainable networks can provide stretch characteristics in multiple directions of strain, similar to that shown in FIG. 9.

A first region of the film 10i can comprise un-bonded areas 86 generally illustrated as bands of unformed material generally lying in a plane defined by the incrementally-stretched adhesively-laminated film 10i. A second region can comprise bond areas 88 that adhesively bond the nub-like ribs 89 of the first and second films extending out of the plane. The ribs 89 can comprise a pattern extending in first and second distinct directions as formed by first and second superimposed patterns.

One will appreciate in light of the disclosure herein that the incrementally-stretched adhesively-laminated films can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include incrementally-stretched adhesively-laminated films to one extent or another. Trash bags and food storage bags may be particularly benefited by the films of the present invention.

Figure 12A:
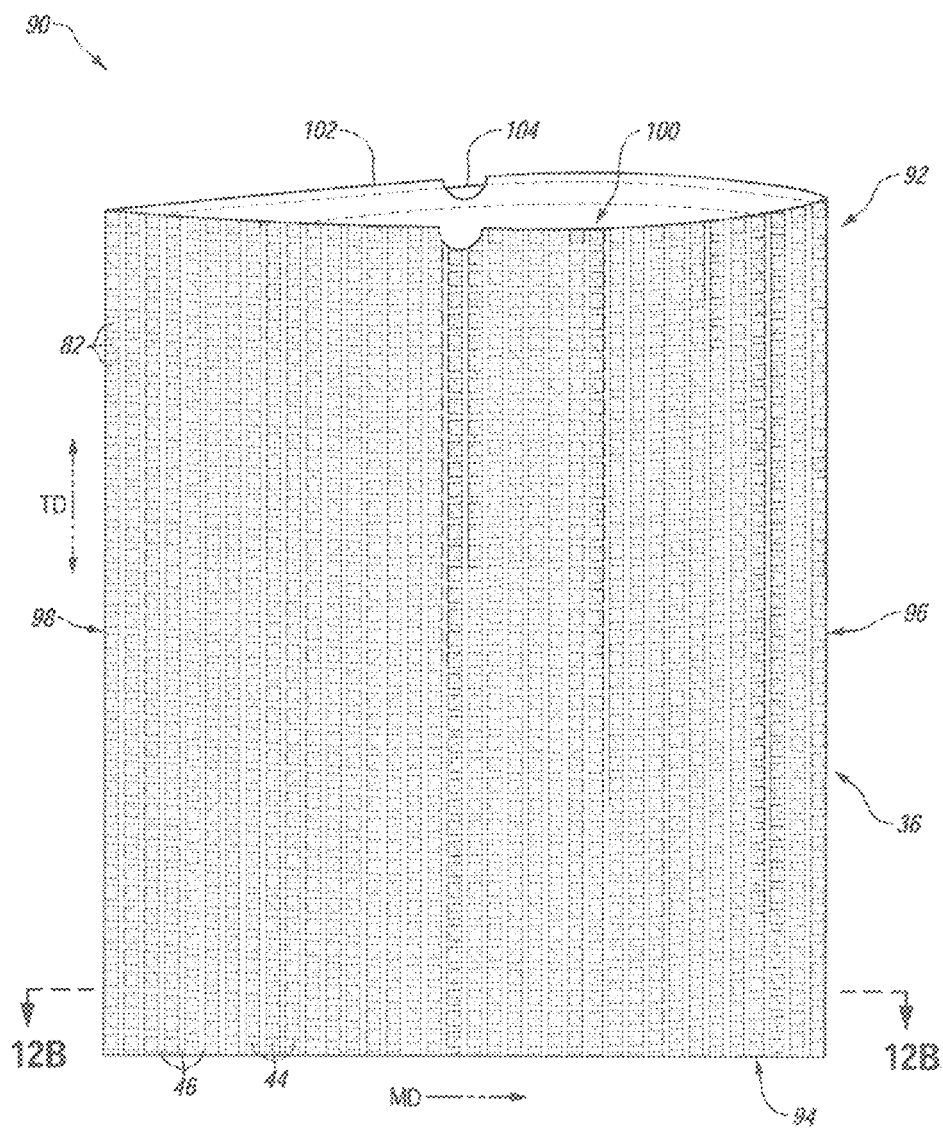
FIG. 12A illustrates a bag incorporating the adhesively-laminated incrementally-stretched film of FIG. 10 in accordance with one or more implementations of the present invention.
Figure 12B:
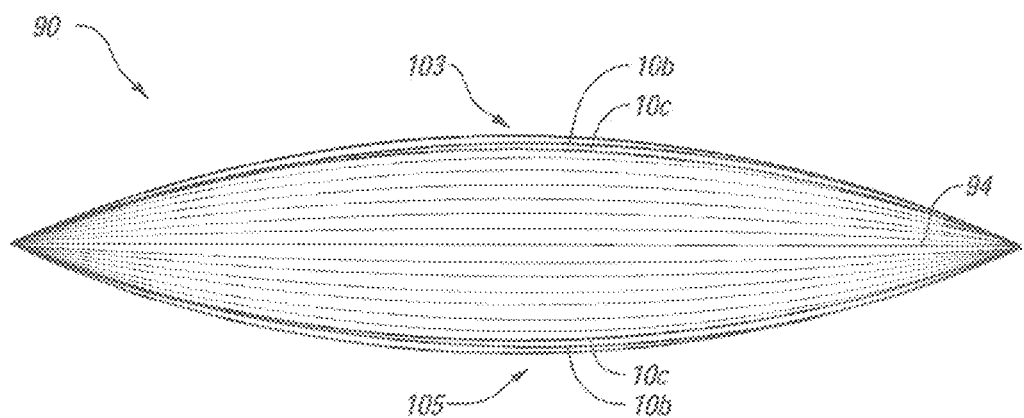
FIG. 12B illustrates a cross-sectional view of the bag of FIG. 12A taken along the line 12B-12B of FIG. 12A.

Referring to FIGS. 12A and 12B, the incrementally-stretched adhesively-laminated film 10h illustrated in FIG. 10 is incorporated in a flexible draw tape bag 90. The bag 90 can include a bag body 92 formed from a piece of incrementally-stretched adhesively-laminated film 10h folded upon itself along a bag bottom 94. Side seams 96 and 98 can bond the sides of the bag body 92 together to form a semi-enclosed container having an opening 100 along an upper edge 102. The bag 90 also optionally includes closure means 104 located adjacent to the upper edge 102 for sealing the top of the bag 90 to form a fully-enclosed container or vessel. The bag 90 is suitable for containing and protecting a wide variety of materials and/or objects. The closure means 104 can comprise flaps, adhesive tapes, a tuck and fold closure, an interlocking closure, a slider closure, a zipper closure, a draw tape or other closure structures known to those skilled in the art for closing a bag.

As shown, the sides of the bag body 92 can include un-stretched regions 44 and stretched regions 46 in the form of ribs. The ribs can extend across the bag 90 in the TD direction when the MD incrementally-stretched film 10b is the outer layer. When the TD incrementally-stretched film 10c is the outer layer, the ribs would extend across the bag 90 in the MD direction. As shown by FIGS. 12A and 12B, discontinuous bond areas 82 adhesively bond the outer MD incrementally-stretched film 10b to the inner TD incrementally-stretched film 10c.

The bag 90 can require less material to form than an identical bag formed with an un-stretched film 10a of the same thermoplastic material. Additionally, despite requiring less material, the bag 90 can include improved properties imparted by incremental stretching and the adhesive bonding. The striped pattern 36 and/or the bond areas 82 can serve to notify a consumer of the improved properties.

Furthermore, as shown by FIGS. 12A and 12B, a bag 90 formed from an incrementally-stretched adhesively-laminated film can have a first layer of thermoplastic material (i.e., film 10b). The first layer (i.e., film 10b) can include first and second side walls joined along a bottom edge, a first side edge, and an opposing second side edge; thereby, forming a first bag. In particular, the bottom edge of the first layer (i.e., film 10b) can comprise a fold. The bag 90 can also include a second layer of thermoplastic material (i.e., film 10c). The second layer (i.e., film 10c) can include including first and second side walls joined along a bottom edge, a first side edge, and an opposing second side edge; thereby, forming a second bag.

As shown by FIG. 12B, the second layer (i.e., film 10c) is positioned within the first layer (i.e., film 10b). Furthermore, in the implementation shown in FIGS. 12A and 12B, both the first layer (i.e., film 10b) and the second layer (i.e., film 10c) are incrementally stretched. In any event, the first layer (i.e., thermoplastic film 10b) and the second layer (i.e., thermoplastic film 10c) are adhesively bonded to each other. Thus, a first side wall 103 of the bag 90 can comprise a first layer (i.e., film 10b) non-continuously and adhesively laminated to the second layer (i.e., film 10c). Similarly, a second side wall 105 of the bag 90 can also comprise a first layer (i.e., film 10b) non-continuously and adhesively laminated to the second layer (i.e., film 10c).

Figure 13:
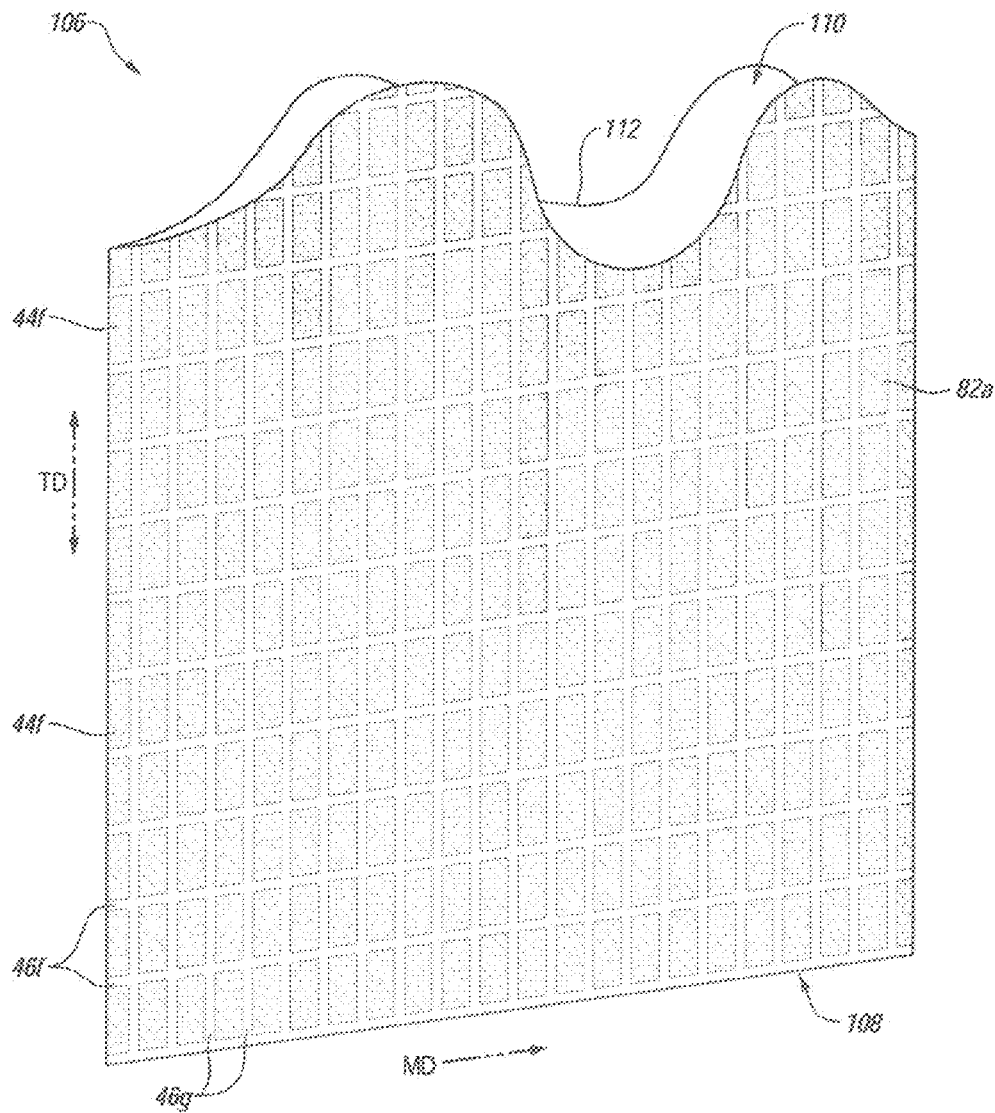
FIG. 13 illustrates another bag incorporating an adhesively-laminated incrementally-stretched film in accordance with one or more implementations of the present invention.

FIG. 13 illustrates a tie bag 106 incorporating an incrementally-stretched adhesively-laminated film including two MD and TD incrementally-stretched and adhesively-bonded films similar to film 10d of FIG. 5. The tie bag 106 includes a pattern of un-stretched regions 44f and stretched regions 46f, 46g created by MD and TD ring rolling. As shown by FIG. 13, bond areas 82a on the un-stretched regions 44f can adhesively bond the inner and outer layers of each side wall of the bag 106. The stretched regions can include ribs 46f that extend across the bag 106 in the machine direction. Additionally, the stretched regions can include ribs 46g that extend across the bag 106 in the transverse direction, or in other words from the bag bottom 108 to flaps 110 of an upper edge 112 of the bag 106.

In comparison with the film 10d of FIG. 5, the spacing between the MD extending ribs 46f and the TD extending ribs 46g is greater in the bag 106. Ring rolls having a greater pitch can create this difference in spacing. Furthermore, the relative spacing between the MD extending ribs 46f and the TD extending ribs 46g differs in the bag 106, while relative spacing is the same in the film 10d. Using TD ring rolls having a greater pitch than the pitch of the MD ring rolls can create this effect.

FIGS. 14-22 illustrate additional implementations of multi-layer bags 114a-i that include incrementally-stretched adhesively-laminated films. In one or more implementations, such as FIGS. 14-16, each bonded pattern 15, 16 can have a largest TD patterned width 118 in the transverse direction (TD) of less than about 25% of the transverse width 119 of the patterned film, or less than about 20% of the transverse width 113 of the film, or less than about 10% of the transverse width 119 of the patterned film, or less than about 5% of the transverse width 113 of the film. In one or more implementations, the bonded patterns have a largest MD patterned width 120 in the machine direction of less than about 25% of the machine width 121 of the patterned film, or less than about 20% of the machine width 111 of the film, or less than about 10% of the machine width 111 of the film, or less than about 5% of the transverse width 111 of the film.

Figure 14:
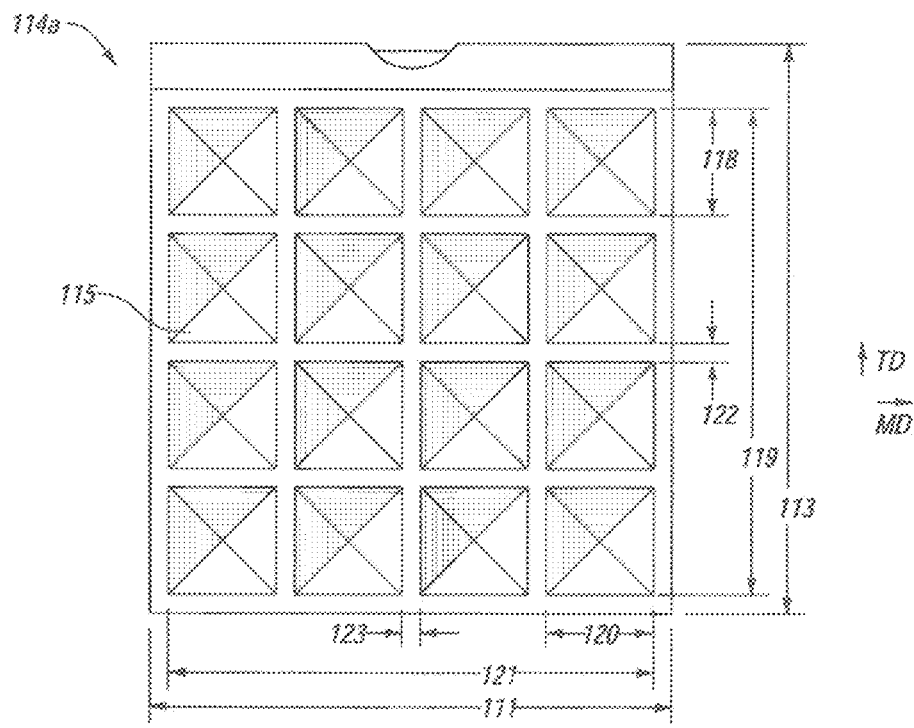
FIG. 14 illustrates another bag incorporating an adhesively-laminated incrementally-stretched film with an adhesive bond pattern in accordance with one or more implementations of the present invention.

As shown by FIG. 14, in one or more implementations the width 118 of the bonded patterns in the transverse direction may be greater than the width of the un-bonded areas 122 in the transverse direction. Similarly, the width 120 of the bonded patterns in the machine direction may be greater than the width of the un-bonded areas 123 in the machine direction.

Figure 15:
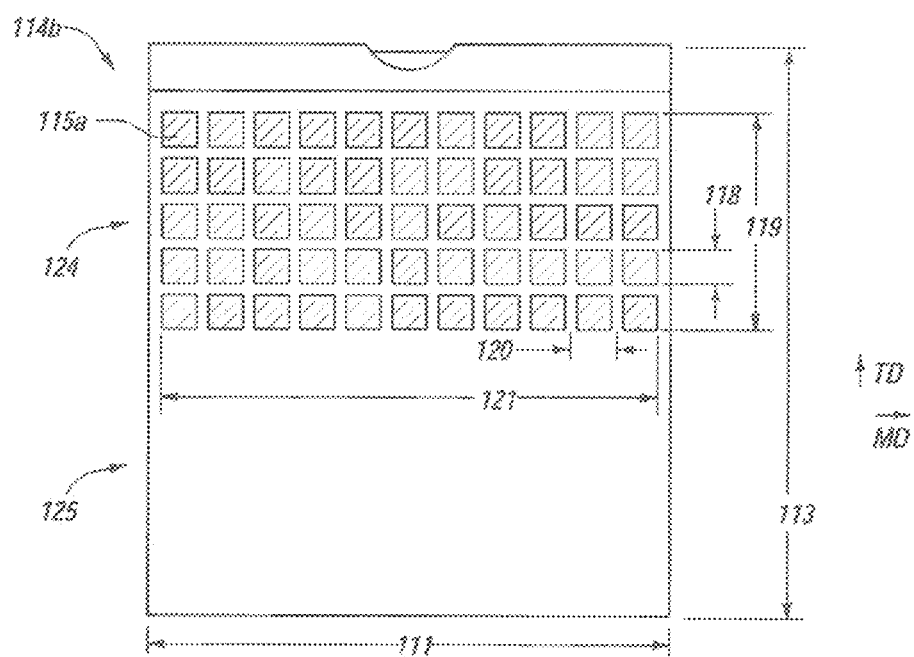
FIG. 15 illustrates another bag incorporating an adhesively-laminated incrementally-stretched film that includes a top section with adhesive bonds in accordance with one or more implementations of the present invention.
Figure 16:
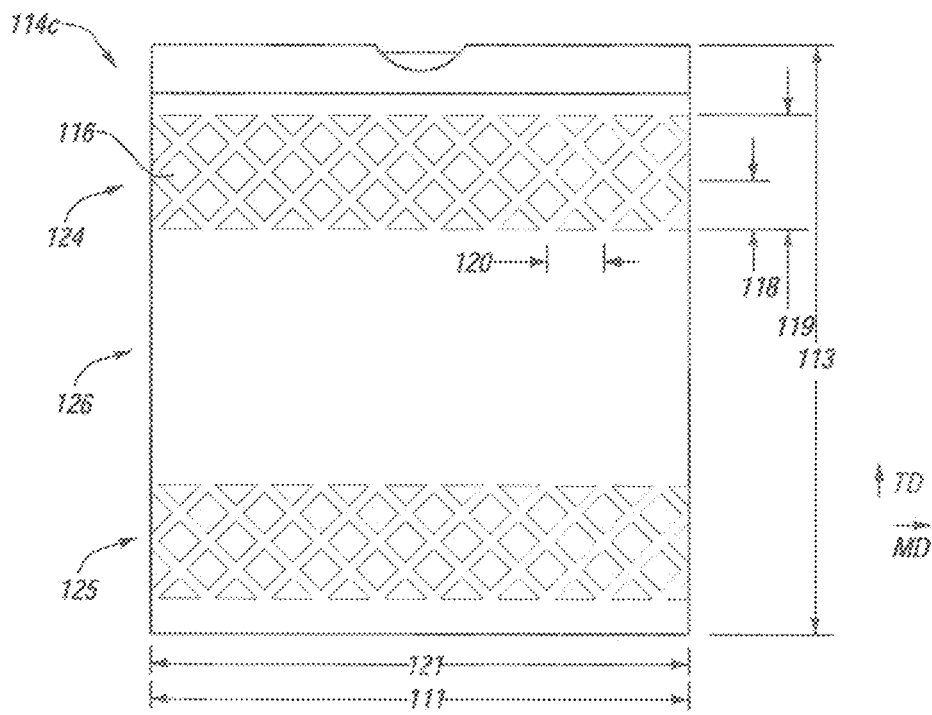
FIG. 16 illustrates another bag incorporating an adhesively-laminated incrementally-stretched film that includes top and bottom sections with adhesive bonds in accordance with one or more implementations of the present invention.

The bonded areas can also be large in comparison to un-bonded areas, for example as seen in FIGS. 14-16. For example, bonded areas of discontinuous lamination can represent at least about 50% of the total area of the section where the discontinuous lamination occurs, or at least about 60% of the total area of the section where the discontinuous lamination occurs, at least about 70% of the total area of the section where the discontinuous lamination occurs, at least about 80% of the total area of the section where the discontinuous lamination occurs.

Figure 17:
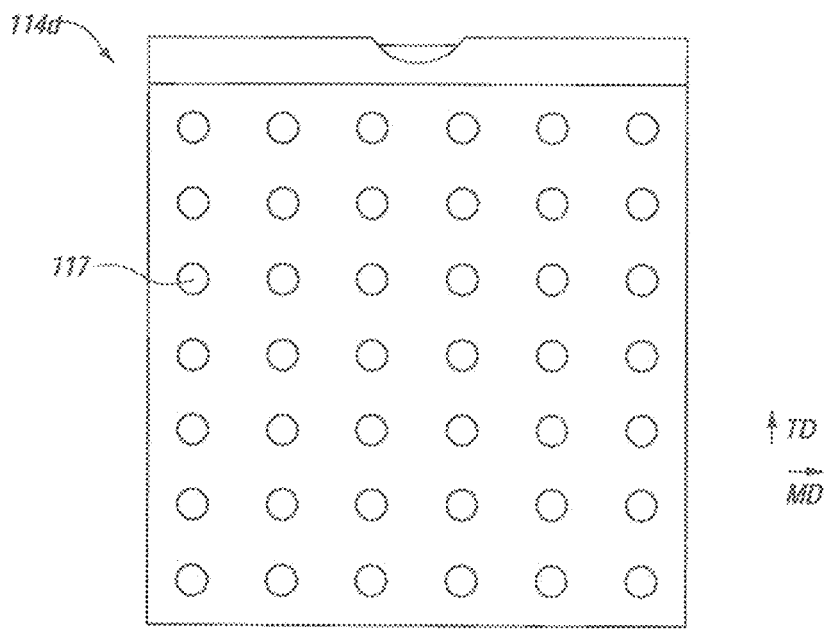
FIG. 17 illustrates another bag incorporating an adhesively-laminated incrementally-stretched film having another bond pattern in accordance with one or more implementations of the present invention.
Figure 18:
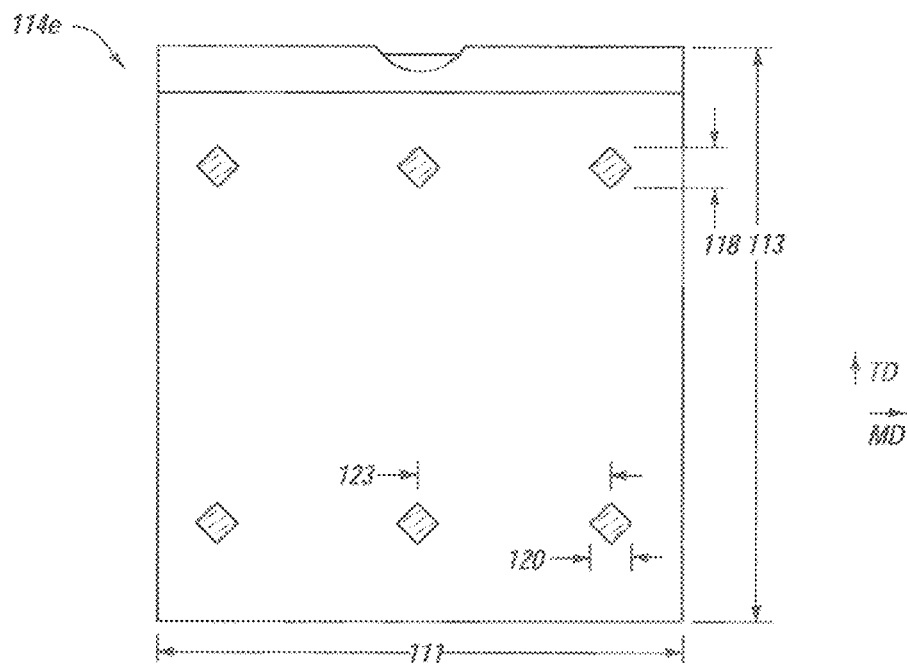
FIG. 18 illustrates yet another bag incorporating an adhesively-laminated incrementally-stretched film having yet another pattern in accordance with one or more implementations of the present invention.

In other implementations, for example in FIGS. 17-18, the bonded areas of discontinuous lamination can represent substantially less than about 50% of the total area of the section where the discontinuous lamination occurs, or less than about 40% of the total area of the section where the discontinuous lamination occurs, or less than about 30% of the total area of the section where the discontinuous lamination occurs, or less than about 10% of the total area of the section where the discontinuous lamination occurs.

Additionally, a manufacturer can vary the size of the bond areas. For example, the bag 114a of FIG. 14 includes relatively large square bond areas 115, while the bag 114b of FIG. 15 includes smaller square bond areas 115a. Similarly, a manufacturer can vary the shape of the bond areas as shown by the square 115, 115a, diamond 116, and circular 117 bond areas of bags 114a-114d of FIGS. 14-17.

In addition to varying the pattern of bond areas in a bag or film, one or more implementations include providing bond areas in certain sections of a bag or film, and only un-bonded regions in other sections of the bag or film. For example, FIG. 15 illustrates a multi-layered bag 114b having an upper section 124 including a plurality of bonded areas 115a, and a lower section 125 devoid of bonded areas. In alternative implementations, the upper section 124 can have no bonded areas, and the lower section can include a plurality of bonded areas 115a. FIG. 16, on the other hand illustrates a multi-layered bag 114c having upper and lower sections 124, 125 including a plurality of bonded areas 116, and a middle section 126 devoid of bonded areas. In alternative implementations, the middle section may include a plurality of bonded areas 116, and the upper and lower sections 124, 125 can have no bonded areas. In any case, certain sections of a film or bag may be void of bonded areas, while others include bonded areas.

Figure 19:
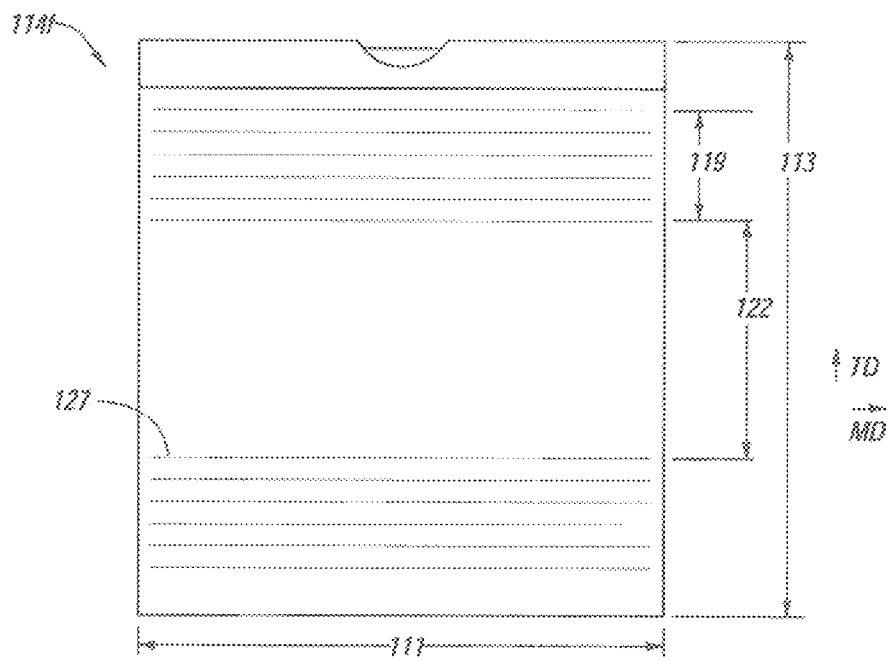
FIG. 19 illustrates still another bag incorporating an adhesively-laminated incrementally-stretched film having a middle section without incremental stretching or bonds in accordance with one or more implementations of the present invention.
Figure 20:
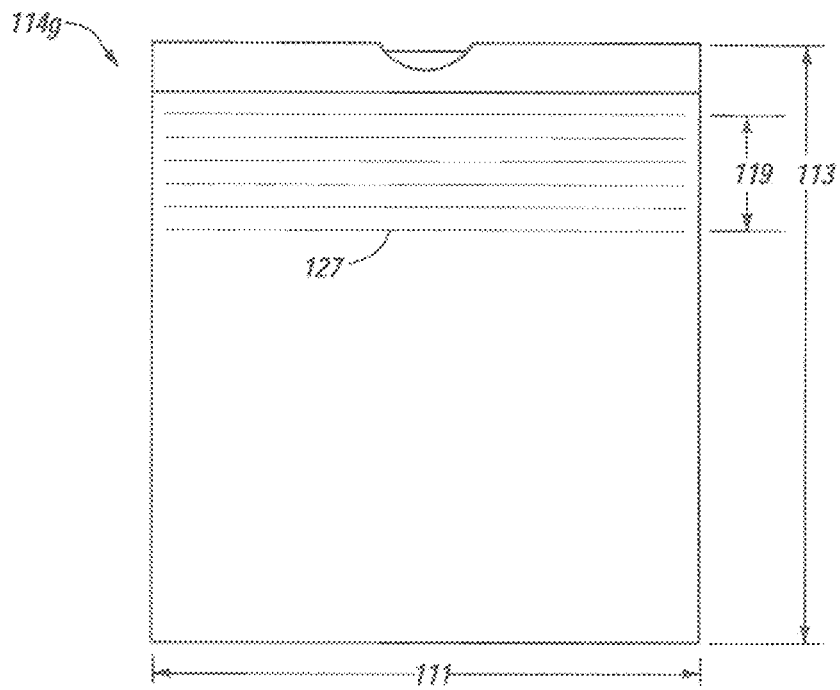
FIG. 20 illustrates another bag incorporating an adhesively-laminated incrementally-stretched film having only a top section with bonds in accordance with one or more implementations of the present invention.
Figure 21:
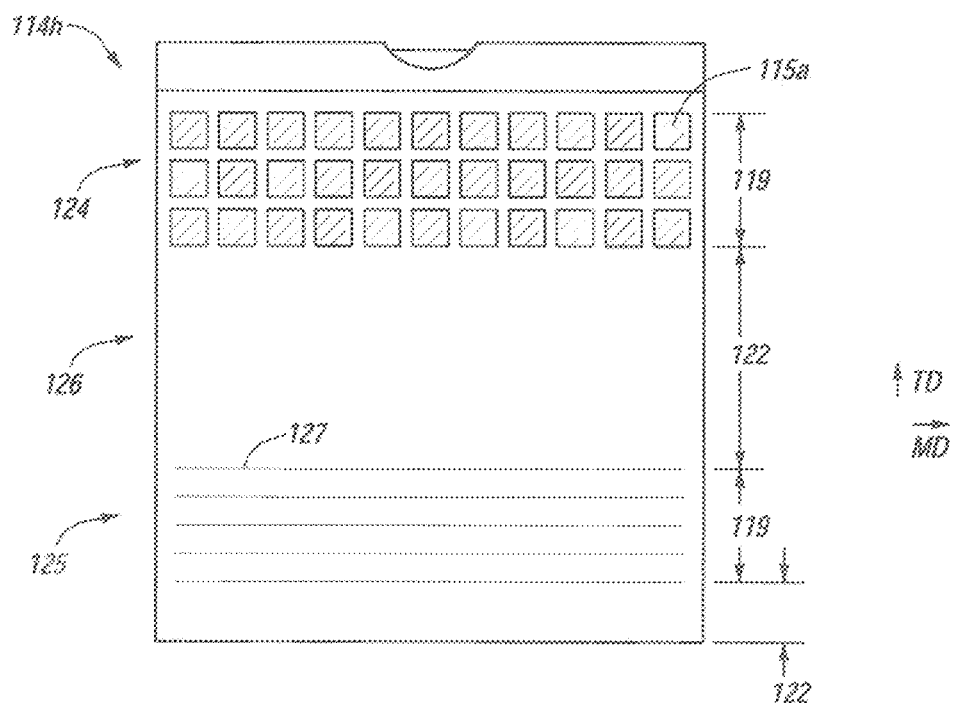
FIG. 21 illustrates another bag incorporating an adhesively-laminated incrementally-stretched film having a top section and a bottom section with different bond patterns in accordance with one or more implementations of the present invention.
Figure 22:
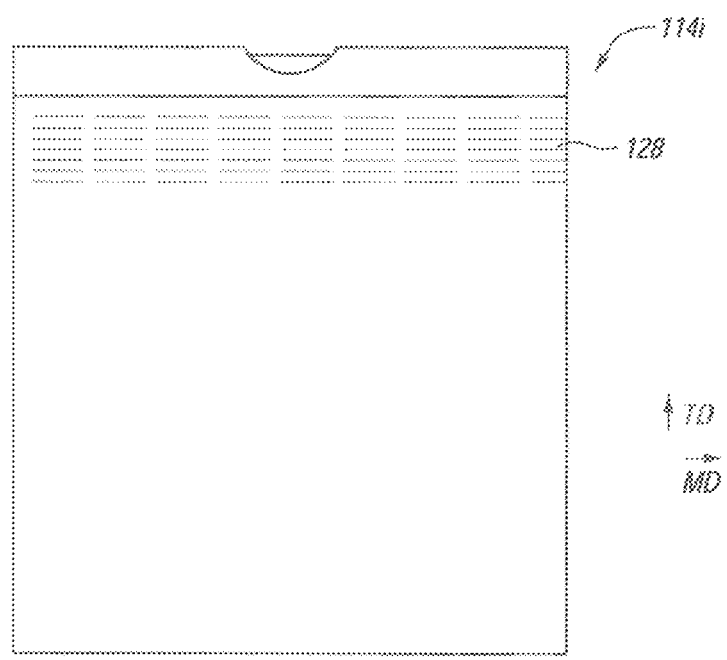
FIG. 22 illustrates still another bag incorporating each of a different pattern having a discontinuous bond pattern in accordance with one or more implementations of the present invention.

Furthermore, one or more implementations include providing different bond patterns in different sections of a bag or film. For example, FIG. 21 illustrates a bag 114h having square bonds 115a in an upper section 124, and linear bonds 127 in a lower section 125. In addition to different bond patterns, a manufacturer can vary the continuity of the bond patterns. Along these lines, FIGS. 19, 20, and 21 illustrate multi-layered bags with partially discontinuous linear bond areas 127, while FIG. 22 illustrates discontinuous linear bond areas 128.

Still further the bond areas can correspond to the type of incremental stretching or can be independent therefrom. For example, bags 114f-114i include linear bond areas 127, 128 corresponding to ribs created by TD ring rolling. In alternative implementations, can be independent of the incremental stretching of one or more of the layers of the bag. For example, when an un-stretched or continuously stretched film is the outer layer of the bag, the bond areas may not correspond to the incremental stretching of the inner layer. Still further, the pattern, location, and shape of the adhesive applied to one or more of the layers of the multi-layer bag 90, 106, 114a-114i can dictate the bond areas.

One will appreciate in light of the disclosure herein that a manufacturer can tailor specific sections, zones, and/or layers of a bag or film with desirable properties by varying the amount, location, types, and/or number of forms of incremental stretching. For example, a manufacturer can provide one or more sections (upper, lower, middle) or layers (inner, outer, middle) of a bag with one set of properties created by one or more forms of incremental stretching, and provide another section or layer with another set of properties created by another (or combination) of incremental stretching. Thus, one will appreciate in light of the disclosure herein that a manufacturer can tailor specific sections or zones of a bag or film with desirable properties by MD, TD, or DD ring rolling, SELF'ing, or combinations thereof. Furthermore, the different ribs and/or bonded area can serve to notify a consumer of the properties of the different sections.

Figure 23:
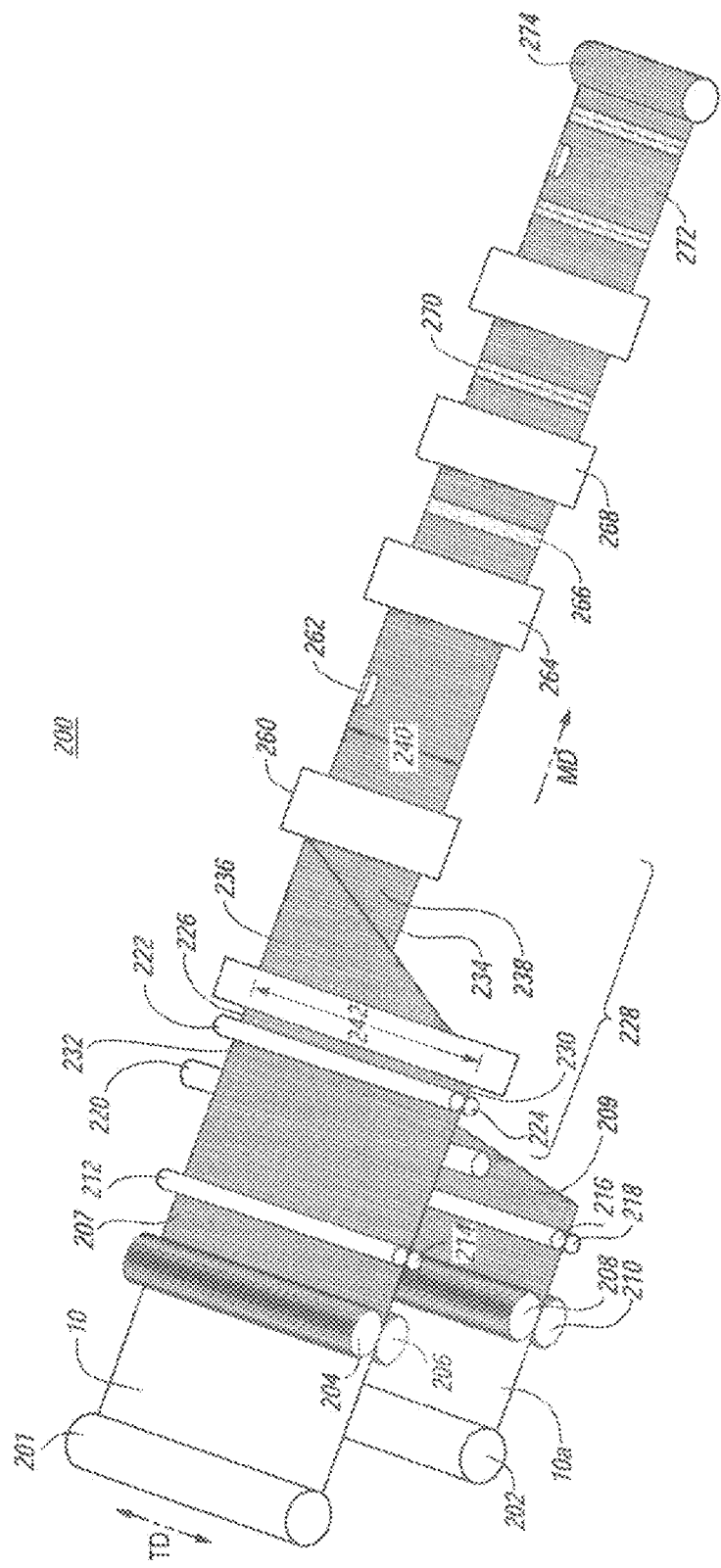
FIG. 23 illustrates a schematic diagram of a bag manufacturing process in accordance with one or more implementations of the present invention.
Figure 24:
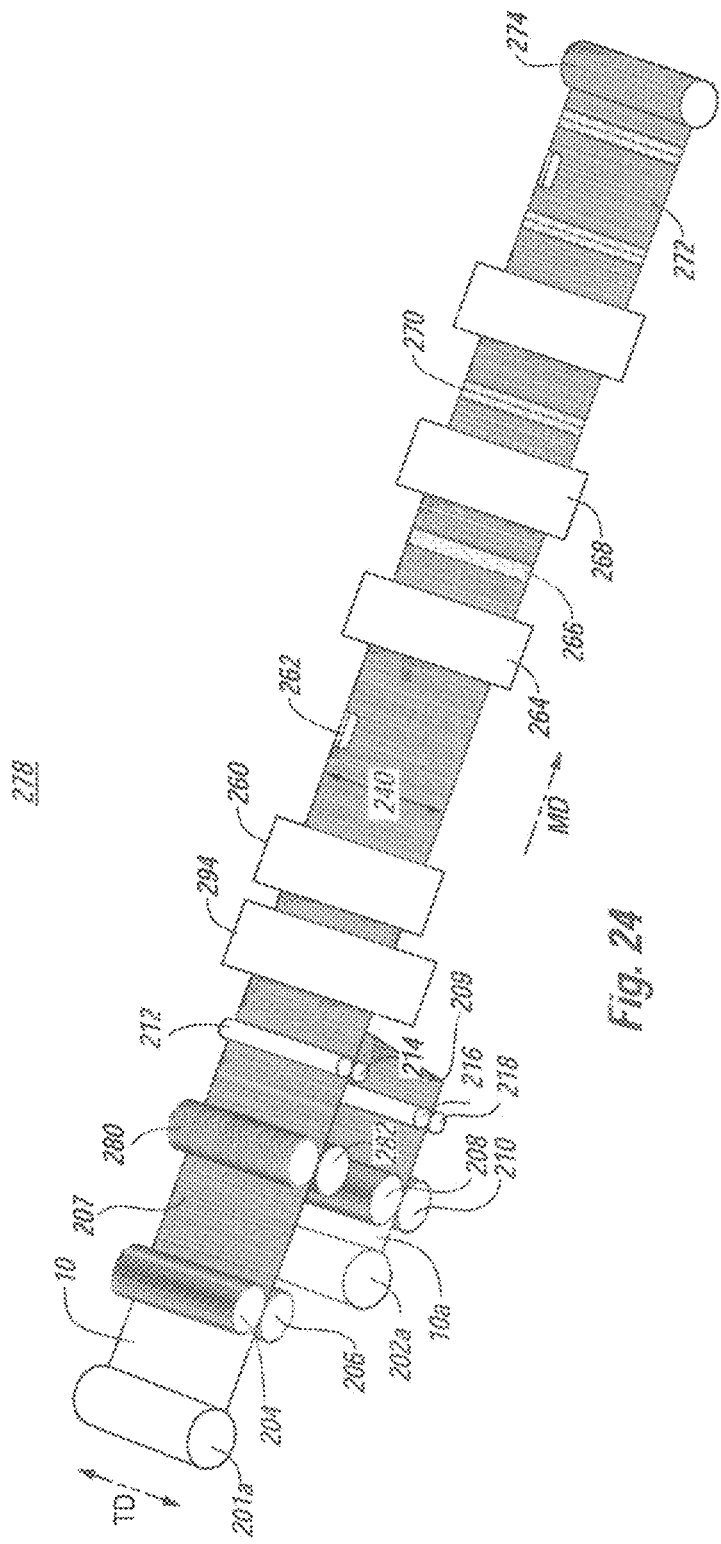
FIG. 24 illustrates a schematic diagram of another bag manufacturing process in accordance with one or more implementations of the present invention.

Implementations of the present invention can also include methods of forming incrementally-stretched adhesively-laminated film and bags including the same. FIGS. 23-25 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

FIG. 23 illustrates an exemplary embodiment of a high-speed manufacturing process 200 for producing incrementally-stretched adhesively-laminated films and bags therefrom. According to the process 200, a first thermoplastic film layer 10 and a second thermoplastic film layer 10a are unwound from rolls 201, 202 and directed along a machine direction.

The process 200 can then include incrementally stretching one or more of the first film layer 10 and the second film layer 10a. For example, the first film layer 10 can pass between first and second cylindrical intermeshing rollers 204, 206 to incrementally stretch the film 10. The intermeshing rollers 204, 206 can have a construction similar to that of intermeshing rollers 12, 14 of FIGS. 1A-1B, or any of the other intermeshing rollers shown or described herein. The rollers 204, 206 may be arranged so that their longitudinal axes are perpendicular to the machine direction. Additionally, the rollers 204, 206 may rotate about their longitudinal axes in opposite rotational directions. In various embodiments, motors may be provided that power rotation of the rollers 204, 206 in a controlled manner. As the film layer 10 passes between the first and second rollers 204, 206, the ridges and/or teeth of the intermeshing rollers 204, 206 can form an incrementally-stretched film 207.

Additionally, the second film layer 10a can optionally pass between third and fourth intermeshing rollers 208, 210 to incrementally stretch the film 10a. The intermeshing rollers 208, 210 can have a construction similar to that of intermeshing rollers 204, 206, or any of the other intermeshing rollers shown or described herein. As the film layer 10a passes between the third and fourth intermeshing rollers 208, 210, the ridges and/or teeth of the intermeshing rollers 204, 206 can form an incrementally-stretched film 209. In alternative implementations, the process 200 may omit incrementally stretching the second film layer 10a. Still further, the process can optionally include continuously stretching the second film layer 10a, embossing the second film layer 10a, or otherwise processing the second film layer 10a.

Incrementally stretching one or more of the films 10, 10a can modify and/or increase one or more of the physical properties of one or more of the films 10, 10a and/or increase the surface area of one or more of the films 10, 10a and/or reduce the gauge of one or more of the films 10, 10a. Furthermore, incrementally stretching one or more of the films 10, 10a can provide one or more of the films 10, 10a with a visual pattern that can serve to notify a consumer that one or more of the films 10, 10a has been processed to enhance one or more properties.

One will appreciate that when both the first film layer 10 and the second film layer 10a are incrementally stretched, they can undergo the same type and/or degree of stretching or different types and/or degrees of stretching. For example, in one or more implementations, the first and second intermeshing rollers 204, 206 and the third and fourth intermeshing rollers 208, 210 can both comprise MD ring rollers 12, 14, but with different pitches and/or DOEs. Still further, first and second cylindrical intermeshing rollers 204, 206 can comprise MD ring rollers 12, 14, while the third and fourth intermeshing rollers 208, 210 comprise MD ring rollers 52, 54. Still further first and second cylindrical intermeshing rollers 204, 206 can comprise ring rollers, while third and fourth intermeshing rollers 208, 210 comprise SELFing rollers 64, 66.

Additionally, while not shown in FIG. 23, one or both the first film layer 10 and the second film layer 10a can undergo a second incremental stretching process after respectively passing through the intermeshing rollers 204, 206, 208, 210. For example, one or more of the first film layer 10 and the second film layer 10a can pass through a second, sequential set of intermeshing rollers. For example, the first film layer 10 can pass through a first set of MD ring rollers (i.e., 204, 206) and then through a second sequential set of TD intermeshing rollers such that the incrementally-stretched film 207 is both MD and TD ring rolled. Thus, one or more of the first film layer 10 and the second layer 10a can undergo any number or combination of the incremental stretching processes described herein above.

During the manufacturing process 200, the incrementally stretched film 10, 10a can also pass through pairs of pinch rollers 212, 214, 216, 218. The pinch rollers 212, 214, 216, 218 can be appropriately arranged to grasp the films 10, 10a. The pinch rollers 212, 214, 216, 218 may facilitate and accommodate the films 10, 10a.

The process 200 can also involve applying an adhesive to one or more of the films 10, 10a. For example, FIG. 23 illustrates that an applicator 220 can apply an adhesive to one or more of the lower surface of the film 10 or the upper surface of the film 10a. The adhesive can comprise hot melt adhesive, a cold glue, an olefinic adhesive to facilitate reclaiming, a pressure sensitive adhesive, or other suitable adhesives. The manufacturer can use the applicator 220 to control the amount of adhesive (i.e., coat weight). In one or more implementations, the manufacturer can control the coat weight of the adhesive to ensure a light bond such that upon applying a strain to the finished incrementally-stretched adhesively-laminated film the first and second film layers will delaminate prior to either the first or second film layers failing.

The applicator 220 can control the pattern of adhesive applied to one or more of the films 10, 10a, and thus, the pattern of the bond areas. In particular, the applicator 220 can apply adhesive to one or more of the films 10, 10a in a pattern such as those described herein above in relation to FIGS. 14-22 (stripes, checkerboard, circles, squares, diamonds, etc.). In alternative implementations, the applicator 220 can apply adhesive to one or more of the films 10, 10a in a spider web like pattern, omega patterns, dots, stitching patterns, widely spaced patterns, or other patterns. Still further, the applicator 220 can apply adhesive in a continuous pattern, discontinuous pattern, or partially discontinuous pattern. Furthermore, the applicator 220 can control where on the films 10, 10a adhesive is applied. Thus, the applicator 220 can apply adhesive to one or more regions or zones of the films 10, 10a.

Additionally, one or more implementations can include filamentation or fiberization of the adhesive. For example, the applicator 220 can produce filament strands of adhesive. The applicator 220 can then use heated air to elongate the strands of adhesive and apply them to one or more of the films 10, 10a in random or ordered patterns. Such fiberization of the adhesive can allow for the control of the coat weight and reduce the amount of adhesive required for a desired bond strength.

After an adhesive is applied to one or more of the films 10, 10a, the films 10, 10a can pass together through a pair of nip or pinch rollers 222, 224. The nip rollers 222, 224 can press the films 10, 10a together thereby allowing the adhesive to bond the films 10, 10a together to form an incrementally-stretched adhesively-laminated film 226. In particular, pistons attached to the nip rollers 222, 224 can actuate the nip rollers 222, 224 to apply a force or pressure to the films 10, 10a.

To produce a finished bag, the processing equipment may further process the incrementally-stretched adhesively-laminated film 226 after the lamination operation. For example, a folding operation 228 can fold the incrementally-stretched adhesively-laminated film 226. The folding operation 228 can fold the incrementally-stretched adhesively-laminated film 226 with visually-distinct stretched regions in half along the transverse direction. In particular, the folding operation 228 can move a first edge 230 adjacent to the second edge 232, thereby creating a folded edge 234. The folding operation 228 thereby provides a first film half 236 and an adjacent second web half 238. The overall width 240 of the second film half 238 can be half the width 242 of the pre-folded incrementally-stretched adhesively-laminated film 226.

Optionally, a draw tape operation 260 can insert a draw tape 262 into the incrementally-stretched adhesively-laminated film 226. Furthermore, a sealing operation 264 can form the parallel side edges of the finished bag by forming heat seals 266 between adjacent portions of the folded incrementally-stretched adhesively-laminated film 226. The heat seals 266 may be spaced apart along the folded incrementally-stretched adhesively-laminated film 226 with visually-distinct stretched regions. The sealing operation 264 can form the heat seals 266 using a heating device, such as, a heated knife.

A perforating operation 268 may form a perforation 270 in the heat seals 266 using a perforating device, such as, a perforating knife. The perforations 270 in conjunction with the folded outer edge 234 can define individual bags 272 that may be separated from the incrementally-stretched adhesively-laminated film 226. A roll 274 can wind the incrementally-stretched adhesively-laminated film 226 embodying the finished bags 272 for packaging and distribution. For example, the roll 274 may be placed into a box or bag for sale to a customer.

In still further implementations, the folded incrementally-stretched adhesively-laminated film 226 may be cut into individual bags along the heat seals 266 by a cutting operation. In another implementation, the folded incrementally-stretched adhesively-laminated film 226 may be folded one or more times prior to the cutting operation. In yet another implementation, the side sealing operation 264 may be combined with the cutting and/or perforation operations 268.

One will appreciate in light of the disclosure herein that the process 200 described in relation to FIG. 23 can be modified to omit or expanded acts, or vary the order of the various acts as desired. For example, three or more separate film layers can be incrementally stretched and laminated together to form an incrementally-stretched adhesively-laminated film 226.

FIG. 24 illustrates yet another manufacturing process 278 for producing an incrementally-stretched adhesively-laminated film and bags therefrom. The process 278 can be similar to process 200 of FIG. 23, except that the films 10, 10a are folded in half to form c-folded films prior to winding on the rolls 201a, 202a. Thus, in such implementations, the films 10, 10a unwound from the rolls 201a, 202a are already folded.

Additionally, the manufacturing process 278 illustrates that after passing through intermeshing rollers 204, 206, the film 10 can pass through another set of intermeshing rollers 280, 282 to incrementally stretch the film 10 a second time. The intermeshing rollers 280, 282 can have a construction similar to that of intermeshing rollers 52, 54 of FIG. 3, or any of the other intermeshing rollers shown or described herein.

Additionally, FIG. 24 illustrates that an insertion operation 294 can inserting the folded film 10 into the folded film 10a. Insertion operation 294 can combine and adhesively laminate the folded films 10, 10a using any of the apparatus and methods described herein in U.S. patent application Ser. No. 13/225,930 filed Sep. 6, 2011 and entitled Apparatus For Inserting A First Folded Film Within A Second Folded Film and Ser. No. 13/225,757 filed Sep. 6, 2011 and entitled Method For Inserting A First Folded Film Within A Second Folded Film, each of which are incorporated herein by reference in their entirety.

As alluded to earlier, incrementally-stretched adhesively-laminated films of one or more implementations can provide an overall thinner film employing a reduced amount of raw material that nonetheless has maintained or increased strength parameters. The following examples present the results of a series of tests performed on thermoplastic films that have been incrementally stretched and then adhesively laminated in accordance with one or more implementations of the present invention. These examples are illustrative of the invention claimed herein and should not be construed to limit in any way the scope of the invention.

EXAMPLE 1

In a first example, a first layer of a base film having a core ply of LLDPE with white pigment and outer plies of LLDPE\LDPE\Antiblock blend was cold MD ring rolled to form an MD ring rolled (RR) film. The MD intermeshing rolls used in Example 1 had a 0.100" pitch and were set at a DOE of 0.110". A second layer of the base film was cold TD ring rolled to form a TD RR film. The TD intermeshing rolls used in Example 1 had a 0.060" pitch and were set at a DOE of 0.032". The MD RR film and the TD RR film were then laminated together using a butene-1-copolymer, hot melt adhesive, Rextac® RT 2730 at four different coat weights shown in Tables I, II, and III as samples 1-4. Tables I, II, and III also shows comparative properties of the base film, the MD RR film, the TD RR film, the combined MD RR and TD RR films not adhesively laminated together, as well as a thicker film.

TABLE I

Dynatup and Tear Resistance of Incrementally-Stretched Adhesively-Laminated Films (1 layer MD RR and 1 layer TD RR)

|  | Coat Weight g/sq. ft. | Gage by Wt. (mils) | Tensile Peel (g-f) | Dynatup Peak Load (lb-f) | Dynatup Energy to max load (in. lb-f) | MD Tear (g) | TD Tear (g) |
| --- | --- | --- | --- | --- | --- | --- | --- |
| Sample 1 | 0.225 | 0.84 | N/A | 11.3 | 8.4 | 434 | 585 |
| Sample 2 | 0.056 | 0.84 | N/A | 11.1 | 11.2 | 496 | 539 |
| Sample 3 | 0.015 | 0.84 | 61 | 10.5 | 9.2 | 387 | 595 |
| Sample 4 | 0.012 | 0.84 | 57 | 11.3 | 10.4 | 425 | 643 |
| Comparison Data | | | | | | | |
| Un-laminated Combined MD and TD RR Films | NA | 0.84 | N/A | 9.4 | 6.9 | 326 | 502 |
| TD RR Film | NA | 0.4 | N/A | 4.6 | 4.4 | 101 | 60 |
| MD RR Film | NA | 0.44 | N/A | 5.4 | 4.8 | 173 | 475 |
| Base Film | NA | 0.6 | N/A | 5.1 | 6.3 | 298 | 473 |
| Thicker Base Film | NA | 0.9 | NA | 4.3 | 3.8 | 262 | 843 |

TABLE II

MD Tensile Properties of Incrementally-Stretched Adhesively-Laminated Films (1 layer MD RR and 1 layer TD RR)

|  | MD Tensile Yield (lb-f) | MD Tensile Peak 1 (lb-f) | MD Tensile Strain 1 (%) | MD Tensile Peak 2 (lb-f) | MD Tensile Strain 2 (%) |
| --- | --- | --- | --- | --- | --- |
| Sample 1 | 0.33 | 4.5 | N/A | 11.3 | 8.4 |
| Sample 2 | 0.43 | 4.9 | N/A | 11.1 | 11.2 |
| Sample 3 | 0.55 | 4.0 | 61 | 10.5 | 9.2 |
| Sample 4 | 0.5 | 3.8 | 57 | 11.3 | 10.4 |
| Comparison Data | | | | | |
| Un-laminated Combined MD and TD RR Films | 0.64 | 4.2 | N/A | 9.4 | 6.9 |
| TD RR Film | 0.27 | 1.7 | N/A | 4.6 | 4.4 |
| MD RR Film | 0.29 | 2.6 | N/A | 5.4 | 4.8 |
| Base Film | 0.73 | 4.1 | N/A | 5.1 | 6.3 |
| Thicker Base Film | 1.42 | 7.2 | NA | 4.3 | 3.8 |

TABLE III

TD Tensile Properties of Incrementally-Stretched Adhesively-Laminated Films (1 layer MD RR and 1 layer TD RR)

|  | TD Tensile Yield (lb-f) | TD Tensile Peak 1 (lb-f) | TD Tensile Strain 1 (%) | TD Tensile Peak 2 (lb-f) | TD Tensile Strain 2 (%) |
| --- | --- | --- | --- | --- | --- |
| Sample 1 | 1.58 | 2.0 | 341 | N/A | N/A |
| Sample 2 | 1.53 | 2.0 | 557 | 1.80 | 750 |
| Sample 3 | 1.4 | 2.1 | 489 | 1.90 | 825 |
| Sample 4 | 1.3 | 1.9 | 558 | 1.80 | 800 |
| Comparison Data | | | | | |
| Un-laminated Combined MD and TD RR Films | 1.3 | 2.1 | 368 | 1.50 | 650 |
| TD RR Film | 0.8 | 1.8 | 287 | NA | NA |
| MD RR Film | 0.6 | 1.6 | 695 | NA | NA |
| Base Film | 0.9 | 2.7 | 639 | NA | NA |
| Thicker Base Film | 1.52 | 4.4 | 682 | NA | NA |

The results from Table I show that even with very low adhesive coating, superior Dynatup, MD tear resistance, and TD tear resistance properties are achieved compared to two layers of non-laminated film or one layer of thicker film. In particular, the results from Table I show adhesively laminating an MD RR film and a TD RR film can balance the MD and TD tear resistance. Furthermore, the individual values for the Dynatup, MD tear resistance, and TD tear resistance properties are unexpectedly higher than the sum of the individual layers. Thus, the incrementally-stretched adhesively-laminated films provide a synergistic effect.

More specifically, as shown by the results from Table I, the TD tear resistance of the incrementally-stretched adhesively-laminated films can be greater than a sum of the TD tear resistance of the individual layers. Similarly, the MD tear resistance of the incrementally-stretched adhesively-laminated films can be greater than a sum of the MD tear resistance of the individual layers. Along related lines, the Dynatup peak load of the incrementally-stretched adhesively-laminated films can be greater than a sum of a Dynatup peak load of the individual layers.

Additionally, the results from Example 1 show that the coat weight of adhesive applied to laminate the layers can range from light coat weights to heavy coat weights. In the case of light coat weights (e.g., samples 3 and 4), that upon applying a strain to the incrementally-stretched adhesively-laminated film the first and second film layers will delaminate prior to either the first or second film layers failing. This is indicated by the tensile peel numbers. Furthermore, once the layers delaminate under stress, they can react independently. Thus, Tables II and III indicate that the lightly adhered incrementally-stretched adhesively-laminated films have two tensile peak loads separated by considerable elongation.

EXAMPLE 2

In Example 2, the same base layer of film as Example 1 was both MD and TD ring rolled using the same ring rolls as Example 1. The two MD and TD RR films were then laminated together using a butene-1-copolymer, hot melt adhesive, Rextac® RT 2730 at five different coat weights shown in Tables IV, V, and VI as samples 5-9.

TABLE IV

Properties of Incrementally-Stretched Adhesively-Laminated Films (both layers MD and TD RR)

| | Coat Wt. g/sq. ft. | Gage by Wt. (mils) | Caliper 1" Foot (mils) | Tensile Peel (g-f) | Dynatup Peak Load (lb-f) | Dynatup Energy to max load (in. lb-f) | Dart Drop F50 (g) |
|---|---|---|---|---|---|---|---|
| Sample 5 | 0.0300 | 0.64 | 1.71 | 81.5 | 11.5 | 11.28 | 254.0 |
| Sample 6 | 0.0150 | 0.65 | 1.85 | 25.5 | 10.3 | 9.61 | |
| Sample 7 | 0.0100 | 0.67 | 1.81 | 27.6 | 10.6 | 9.34 | 264.0 |
| Sample 8 | 0.0075 | 0.66 | 1.79 | 2.27 | 9.7 | 10.99 | |
| Sample 9 | 0.0060 | 0.66 | 1.87 | 7.79 | 9.9 | 12.21 | 260.0 |
| Comparison Data | | | | | | | |
| Thicker Base Film | NA | 0.9 | 0.88 | NA | 4.3 | 3.8 | 180 |

TABLE V

Properties of Incrementally-Stretched Adhesively-Laminated Films (both layers MD and TD RR)

| | MD Tear (g) | TD Tear (g) | MD Tensile Yield (lb-f) | MD Tensile Peak 1 (lb-f) | MD Tensile Strain 1 (%) | MD Tensile Peak 2 (lb-f) | MD Tensile Strain 2 (%) |
|---|---|---|---|---|---|---|---|
| Sample 5 | 418 | 511 | 0.216 | 5.3 | 111.525 | 4.72 | 120.474 |
| Sample 6 | 349 | 441 | 0.224 | 5.2 | 128.574 | 5.62 | 146.256 |
| Sample 7 | 353 | 406 | 0.204 | 5.5 | 138.238 | 4.62 | 113.35 |
| Sample 8 | 335 | 423 | 0.185 | 6.0 | 157.542 | 5.68 | 143.349 |
| Sample 9 | 319 | 450 | 0.194 | 5.8 | 145.162 | 4.79 | 140.156 |
| Comparison Data | | | | | | | |
| Thicker Base Film | 262 | 843 | 1.42 | 7.2 | 466 | NA | NA |

TABLE VI

Properties of Incrementally-Stretched Adhesively-Laminated Films (both layers MD and TD RR)

| | TD Tensile Yield (lb-f) | TD Tensile Peak 1 (lb-f) | TD Tensile Strain 1 (%) | TD Tensile Peak 2 (lb-f) | TD Tensile Strain 2 (%) |
|---|---|---|---|---|---|
| Sample 5 | 0.867 | 2.1 | 497.5 | 2.52 | 549.26 |
| Sample 6 | 0.853 | 2.0 | 484 | 2.09 | 494.31 |
| Sample 7 | 0.932 | 2.6 | 525.7 | 2.50 | 532.15 |
| Sample 8 | 0.849 | 2.4 | 553.7 | 2.39 | 566 |
| Sample 9 | 0.814 | 2.1 | 599.6 | 2.10 | 656.98 |
| Comparison Data | | | | | |
| Thicker Base Film | 1.52 | 4.4 | 682 | NA | NA |

The results from Tables IV, V, and VI show that even with very low adhesive coating, superior Dynatup, MD tear resistance, and TD tear resistance properties are achieved compared to two layers of non-laminated film or one layer of thicker film. Additionally, the results from Tables IV, V, and VI in conjunction with the Comparison Data from Tables I, II, and III show that incrementally-stretched adhesively-laminated films of one or more implementations can allow for a reduction in basis weight (gauge by weight) as much as 50% and still provide enhanced strength parameters.

In addition to allowing for films with less raw material yet enhanced strength parameters, the results from Tables IV, V, and VI further show that incrementally-stretched adhesively-laminated films of one or more implementations can have an increased gauge ())i.e., caliper) despite the reduction in basis weight. Some consumers may associate thinner films with decreased strength. Indeed, such consumers may feel that they are receiving less value for their money when purchasing thermoplastic film products with smaller gauges. One will appreciate in light of the disclosure herein that despite a reduction in raw material, incrementally-stretched adhesively-laminated films of one or more implementations may be and look thicker than a single layer of film with a higher basis weight. Thus, one or more implementations can enhance the look and feel of a film in addition to enhancing the strength parameters of the film.

EXAMPLE 3

In Example 3, one white layer of HDPE with a low MD tear resistance was cold stretched by MD ring rolling at 0.110 DOE. Another black layer of LLDPE was cold stretched by MD ring rolling at 0.110 DOE followed by TD ring rolling at 0.032 DOE and then laminated together with the same adhesive. Again, with the two ply laminates superior properties were obtained even at very low adhesive levels compared to a single ply film as shown by the results of Tables VII-IX.

TABLE VII

Dynatup and Tear Resistance of Incrementally-Stretched Adhesively-Laminated Films (1 layer MD RR and 1 layer MD and TD RR)

|  | Coat Wt. g/sq. ft. | Gage by Wt. (mils) | Dynatup Peak Load (lb-f) | Dynatup Energy to max load (in. lb-f) | Dart Drop F50 (g) | MD Tear (g) | TD Tear (g) |
|---|---|---|---|---|---|---|---|
| Sample 10 | 0.0300 | 0.67 | 11.83 | 11.86 | 284 | 357 | 575 |
| Sample 11 | 0.0150 | 0.67 | 11.79 | 14.21 |  | 357 | 532 |
| Sample 12 | 0.0100 | 0.67 | 10.99 | 10.77 | 288 | 373 | 502 |
| Sample 13 | 0.0075 | 0.67 | 11.80 | 11.60 |  | 360 | 530 |
| Sample 14 | 0.0060 | 0.67 | 12.60 | 10.57 | 260 | 385 | 535 |
| Comparison Data |
| Thicker Base Film | NA | 0.9 | 4.3 | 3.8 | 180 | 262 | 843 |

TABLE VIII

MD Tensile Properties of Incrementally-Stretched Adhesively-Laminated Films (1 layer MD RR and 1 layer MD and TD RR)

|  | MD Tensile Yield (lb-f) | MD Tensile Peak 1 (lb-f) | MD Tensile Strain 1 (%) | MD Tensile Peak 2 (lb-f) | MD Tensile Strain 2 (%) |
|---|---|---|---|---|---|
| Sample 10 | 0.304 | 5.1 | 135 | 2.25 | 325 |
| Sample 11 | 0.307 | 5.1 | 128 | 3.1 | 350 |
| Sample 12 | 0.292 | 5.23 | 138 | 3.1 | 375 |
| Sample 13 | 0.265 | 3.75 | 161 | 2.25 | 375 |
| Sample 14 | 0.332 | 5.25 | 119 | 2.75 | 350 |
| Comparison Data |
| Thicker Base Film | 1.42 | 7.2 | 466 | NA | NA |

TABLE IX

TD Tensile Properties of Incrementally-Stretched Adhesively-Laminated Films (1 layer MD RR and 1 layer MD and TD RR)

|  | TD Tensile Yield (lb-f) | TD Tensile Peak 1 (lb-f) | TD Tensile Strain 1 (%) | TD Tensile Peak 2 (lb-f) | TD Tensile Strain 2 (%) |
|---|---|---|---|---|---|
| Sample 10 | 1.1 | 2.4 | 511 | 1.8 | 650 |
| Sample 11 | 1.1 | 1.9 | 506 | 1.25 | 600 |
| Sample 12 | 1.1 | 2.2 | 516 | 1.8 | 650 |
| Sample 13 | 1.1 | 1.9 | 470 | 1.7 | 560 |
| Sample 14 | 1.1 | 2.2 | 482 | 1.25 | 600 |
| Comparison Data |
| Thicker Base Film | 1.52 | 4.4 | 682 | NA | NA |

EXAMPLE 4

In a fourth example, a bag formed from an incrementally-stretched adhesively-laminated film were compared to single ply bags of heavier basis weight using a consumer test with 17 lbs. of mixed garbage on an end use scale of 1-5. The laminate of two layers which were independently MD ring rolled and then TD ring rolled followed by adhesive lamination has an excellent score comparable to single layer bags of higher basis weight.

TABLE VIII

End Use Testing

| Sample | Gage by Wt. (mils) | End use score |
|---|---|---|
| Incrementally-Stretched Adhesively-Laminated | 0.66 | 4.16 |
| MD ring rolled single layer | 0.80 | 4.08 |
| Strainable network single layer | 0.85 | 4.50 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for forming an incrementally-stretched adhesively-laminated film, comprising:
   providing a first continuous thermoplastic film layer;
   providing at least a second continuous thermoplastic film layer;
   incrementally cold stretching the first continuous thermoplastic film layer to form a first plurality of alternating thick ribs and thinner stretched regions;
   incrementally cold stretching the second continuous thermoplastic film layer to form a second plurality of alternating thick ribs and thinner stretched regions;
   aligning a machine direction of the first continuous thermoplastic film layer with a machine direction of the second continuous thermoplastic film layer so that the machine direction of the first continuous thermoplastic film layer is parallel to the machine direction of the second continuous thermoplastic film layer; and
   adhesively laminating the first continuous thermoplastic film layer to the second continuous thermoplastic film layer.

2. The method as recited in claim 1, further comprising applying a coat weight of adhesive to one or more of the first and second continuous thermoplastic film layers such that upon applying a strain to the incrementally-stretched adhesively-laminated film the first and second continuous thermoplastic film layers will delaminate prior to either the first or second continuous thermoplastic film layers failing.

3. The method as recited in claim 1, wherein the incrementally-stretched adhesively-laminated film has a basis weight less than a combined basis weight of the first and second continuous thermoplastic film layers prior to cold stretching one or more of the first continuous thermoplastic film layer and the second continuous thermoplastic film layer.

4. The method as recited in claim 2, wherein a MD tear resistance of the incrementally-stretched adhesively-laminated film is greater than a sum of an MD tear resistance of the first continuous thermoplastic film layer and an MD tear resistance of the second continuous thermoplastic film layer.

5. The method as recited in claim 1, wherein incrementally cold stretching the first continuous thermoplastic film layer comprises passing at least a section of the first continuous thermoplastic film layer through one or more of TD ring rollers, MD ring rollers, or SELFing rollers.

6. The method as recited in claim 1, further comprising forming the incrementally-stretched adhesively-laminated film into a bag.

7. The method as recited in claim 1, wherein adhesively laminating the first continuous thermoplastic film layer to the second continuous thermoplastic film layer comprises forming a plurality of randomly arranged adhesive bonds securing the first continuous thermoplastic film layer directly to the second continuous thermoplastic film layer.

8. The method as recited in claim 1, wherein adhesively laminating the first continuous thermoplastic film layer to the second continuous thermoplastic film layer comprises producing filament strands of adhesive and applying the filament strands of adhesive to one or more of the first continuous thermoplastic film layer or the second continuous thermoplastic film layer.

9. The method as recited in claim 8, wherein applying the filament strands of adhesive to one or more of the first continuous thermoplastic film layer or the second continuous thermoplastic film layer comprises using heated air to elongate the filament strands of adhesive and apply them to one or more of the first continuous thermoplastic film layer or the second continuous thermoplastic film layer.

10. The method as recited in claim 1, wherein incrementally cold stretching the first continuous thermoplastic film layer to form the first plurality of alternating thick ribs and thinner stretched regions comprises forming the first plurality of alternating thick ribs and thinner stretched regions so they extend in a first direction.

11. The method as recited in claim 10, wherein incrementally cold stretching the second continuous thermoplastic film layer to form the second plurality of alternating thick ribs and thinner stretched regions comprises forming the second plurality of alternating thick ribs and thinner stretched regions so they extend in a second direction.

12. The method as recited in claim 11, wherein first direction in which the first plurality of alternating thick ribs and thinner stretched regions extend is parallel to the second direction in which the second plurality of alternating thick ribs and thinner stretched regions extend.

13. The method as recited in claim 11, wherein first direction in which the first plurality of alternating thick ribs and thinner stretched regions extend is perpendicular to the second direction in which the second plurality of alternating thick ribs and thinner stretched regions extend.

14. A method for forming an incrementally-stretched adhesively-laminated film, comprising:
aligning a machine direction of a first continuous thermoplastic film layer with a machine direction of a second continuous thermoplastic film layer so that the machine direction of the first continuous thermoplastic film layer is parallel to the machine direction of the second continuous thermoplastic film layer;
passing the first continuous thermoplastic film layer through a first pair of intermeshing rollers to form a first plurality of alternating thick ribs and thinner stretched regions;
passing the second continuous thermoplastic film layer through a second pair of intermeshing rollers to form a second plurality of alternating thick ribs and thinner stretched regions;
applying an adhesive to one or more of the first continuous thermoplastic film layer or the second continuous thermoplastic film layer; and
passing the first continuous thermoplastic film layer and the second continuous thermoplastic film layer through a pair of nip rollers to adhesively laminate the first continuous thermoplastic film layer to the second continuous thermoplastic film layer.

15. The method as recited in claim 14, wherein applying an adhesive to one or more of the first continuous thermoplastic film layer or the second continuous thermoplastic film layer comprises forming a plurality of randomly arranged adhesive areas to secure the first continuous thermoplastic film layer directly to the second continuous thermoplastic film layer.

16. The method as recited in claim 14, wherein applying an adhesive to one or more of the first continuous thermoplastic film layer or the second continuous thermoplastic film layer comprises producing filament strands of adhesive and applying the filament strands of adhesive to one or more of the first continuous thermoplastic film layer or the second continuous thermoplastic film layer.

17. The method as recited in claim 16, wherein applying the filament strands of adhesive to one or more of the first continuous thermoplastic film layer or the second continuous thermoplastic film layer comprises using heated air to elongate the filament strands of adhesive and apply them to one or more of the first continuous thermoplastic film layer or the second continuous thermoplastic film layer.

18. The method as recited in claim 14, wherein passing the first continuous thermoplastic film layer through a first pair of intermeshing rollers to form a first plurality of alternating thick ribs and thinner stretched regions comprises forming the first plurality of alternating thick ribs and thinner stretched regions so they extend in a first direction.

19. The method as recited in claim 18, passing the second continuous thermoplastic film layer through a first pair of intermeshing rollers to form a second plurality of alternating thick ribs and thinner stretched regions comprises forming the second plurality of alternating thick ribs and thinner stretched regions so they extend in a second direction.

20. The method as recited in claim 19, wherein first direction in which the first plurality of alternating thick ribs and thinner stretched regions extend is parallel to the second direction in which the second plurality of alternating thick ribs and thinner stretched regions extend.

* * * * *